United States Patent [19]
Ishida

[11] Patent Number: 5,350,912
[45] Date of Patent: Sep. 27, 1994

[54] SYSTEM FOR CONTROLLING MOVEMENT OF A MOBILE BODY ALONG A TARGET PATH

[75] Inventor: Shinnosuke Ishida, Wako, Japan

[73] Assignee: Honda Giken Kogyo Kabushiki Kaisha, Tokyo, Japan

[21] Appl. No.: 5,026

[22] Filed: Jan. 15, 1993

[30] Foreign Application Priority Data

Jan. 17, 1992 [JP] Japan .................................. 4-006894

[51] Int. Cl.$^5$ .............................................. G05B 1/00
[52] U.S. Cl. ...................................... 250/202; 180/170
[58] Field of Search ............................. 250/202, 203.1; 356/141, 152; 180/167, 168, 170; 244/3.1

[56] References Cited

U.S. PATENT DOCUMENTS 4,049,961  9/1977  Marcy ................................. 250/202
4,578,574  3/1986  Grant et al. .......................... 250/202

FOREIGN PATENT DOCUMENTS 3231311 10/1991 Japan .

*Primary Examiner*—David C. Nelms
*Assistant Examiner*—Stephone B. Allen
*Attorney, Agent, or Firm*—Lyon & Lyon

[57] ABSTRACT

A mobile body such as an automobile is controlled to move substantially along a target path by a control system. The control system determines a target point on the target path, a control quantity such as a yaw rate to reach the target point to cause the mobile body to reach the target point from an optional position, the direction in which the mobile body moves at the target point based on the control quantity to reach the target point, the angular difference between the direction and the target path at the target point as a target point angular difference, and a target control quantity such as a target yaw rate for the mobile body by correcting the control quantity to reach the target point based on the target point angular difference. The mobile body is controlled based on the target control quantity.

11 Claims, 12 Drawing Sheets

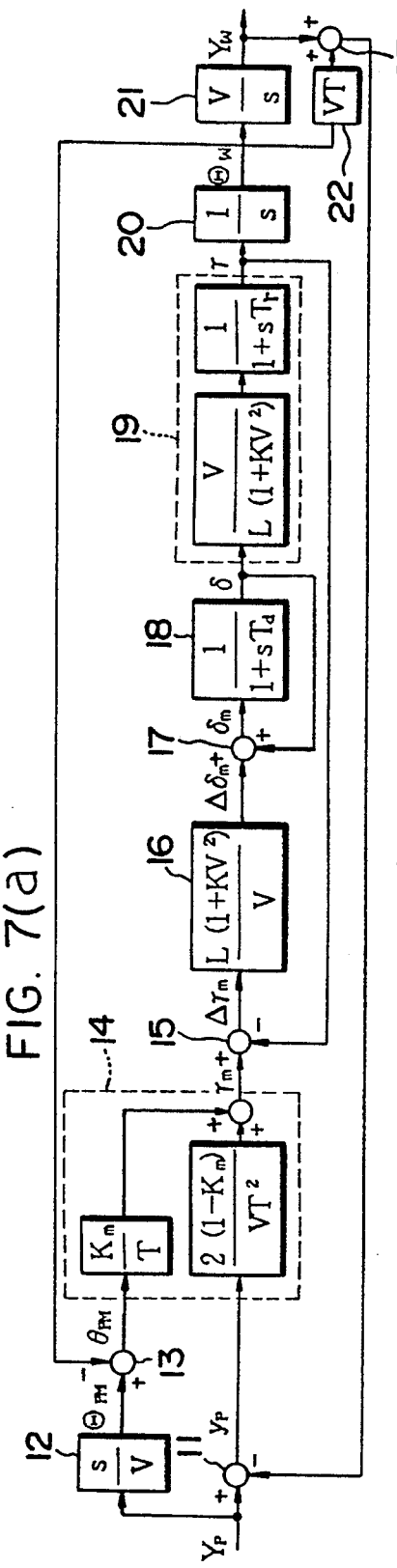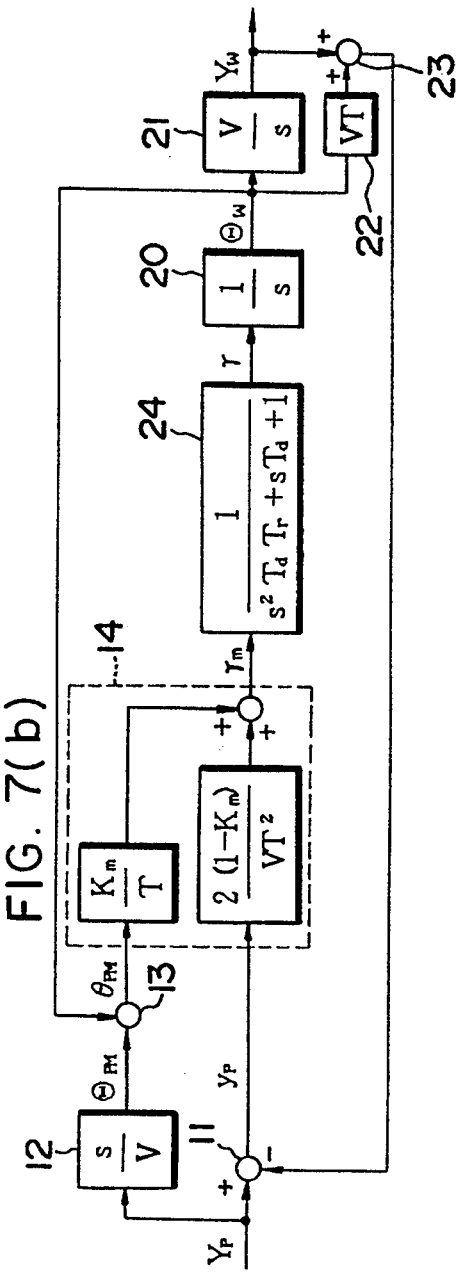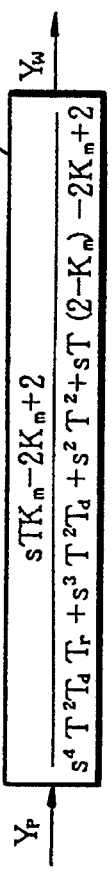
FIG. 7(a)
FIG. 7(b)
FIG. 7(c)

T=1sec, Td=0.3, Tr=0.2, Km=0

T=1sec, Td=0.3, Tr=0.2, Km=0.5

T=1sec, Td=0.3, Tr=0.2, Km=0.9

T=1sec, Td=0.3, Tr=0.1, Km=0

T=1sec, Td=0.3, Tr=0.1, Km=0.5

T=1sec, Td=0.3, Tr=0.1, Km=0.9

T=0.8sec, Td=0.3, Tr=0.1, Km=0

T=0.8sec, Td=0.3, Tr=0.1, Km=0.5

T=0.8sec, Td=0.3, Tr=0.1, Km=0.5

T=1sec, Td=0.5, Tr=0.2, Km=0

T=1sec, Td=0.5, Tr=0.2, Km=0.5

T=1sec, Td=0.5, Tr=0.2, Km=0.9

SYSTEM FOR CONTROLLING MOVEMENT OF A MOBILE BODY ALONG A TARGET PATH

BACKGROUND OF THE INVENTION

1. Field of the Invention

The present invention relates to a control system for moving a real mobile body such as an automobile, an airplane, a ship, an automatic walking robot, or a robot arm, or a virtual mobile body in a computer game, a simulation device, or the like, substantially along a target path.

2. Description of the Prior Art

Mobile bodies that can be controlled to move in varying directions include a real mobile body such as an automobile, an airplane, a ship, an automatic walking robot, or a robot arm, or a virtual mobile body in a computer game, a simulation device, or the like. Some known mobile bodies may be controlled to move automatically substantially along a predetermined target path.

For example, an automobile disclosed in Japanese laid-open patent publication No. 3-231311 is an automatic running vehicle that is automatically steered to run substantially along a target path which has been established in a possible range on a road or the like.

The disclosed automatic running vehicle has an imaging device on a front portion thereof and a processor for processing an image produced by the imaging device to determine a possible range on a road and determining a target path in the possible range for the vehicle to run along. The amount by which the wheels of the vehicle are to be steered, i.e., the steering angle, is controlled to move the vehicle substantially along the target path.

The steering angle is controlled in the manner described below.

As shown in FIG. 3 of the accompanying drawings, it is assumed that a vehicle W and a target path M are relatively positioned as shown, and an x-y coordinate system has an origin 0 on the vehicle W, an x-axis aligned with the longitudinal axis of the vehicle W, and a y-axis aligned with the transverse axis of the vehicle W.

To control the steering angle of the vehicle W, a target point P is set on the target path M forwardly of the vehicle W.

The target point P has an x coordinate, or a component along the x-axis, which is the same as a distance $x_P$ ($=VT$) that is traversed when the vehicle W moves at a present vehicle speed V along the x-axis for a predetermined predicted time T.

If the present yaw rate (angular velocity) of the vehicle W is $\gamma$, then the vehicle W will run along an imaginary arcuate path S depending on the yaw rate $\gamma$. At this time, the vehicle W moves along the path S to a point Q for the distance $x_P$ along the x-axis, and the vehicle W is displaced a distance y in the transverse direction, i.e., the y-axis direction. The distance y, i.e., the y coordinate or the component along the y-axis of the point Q, is approximately expressed by the following equation (1):

$$y = \frac{x_P^2}{2V} \cdot \gamma \frac{VT^2}{2} \cdot \gamma. \quad (1)$$

The distance which the vehicle W is displaced in the transverse direction, i.e., the y-axis direction, toward the target point P is indicated by $y_P$, i.e., the y coordinate or the component along the y-axis of the point P is indicated by $y_P$. If the distance $y_P$ is substituted in the equation (1) and it is solved for $\gamma$, then the yaw rate $\gamma_P$ for bringing the vehicle W to the target point P is given by the equation (2):

$$\gamma_P = \frac{2V}{x_P^2} \cdot y_P = \frac{2}{VT^2} \cdot y_P. \quad (2)$$

When the present yaw rate $\gamma$ of the vehicle W is corrected into the yaw rate $\gamma_P$ thus determined, the vehicle W can run along an imaginary arcuate path $S_P$ toward the target point P.

If the steering angle of steerable wheels 6 of the vehicle W is $\delta$ as shown in FIG. 1 of the accompanying drawings, then the steering angle $\delta$ and the yaw rate $\gamma$ are generally related to each other according to the following equation:

$$\delta = \frac{L(1 + KV^2)}{V} \cdot \gamma \quad (3)$$

where L is the wheelbase of the vehicle W and K a stability factor based on the steering characteristics of the vehicle W.

Consequently, the steering angle $\delta$ for producing the yaw rate $\gamma_P$ is determined by substituting the yaw rate $\gamma_P$ according to the equation (2) in the equation (3), and the vehicle W can be controlled to run toward the target point P by steering the steerable wheels through the determined steering angle $\delta$.

The above calculations and process of controlling the steering angle are carried out successively at predetermined time intervals to move the vehicle W toward the target path M and finally along the target path M.

According to the disclosed automatic running vehicle, basically, the steering angle is controlled to reduce only the positional difference between the vehicle W and the target path M in the transverse direction, i.e., the y-axis direction, at the position of the vehicle W after the predicted time T, so that the vehicle W is controlled to run along the target path M. Therefore, depending on the curvature of the target path M, the angle $\theta_{PW}$ at which the vehicle W is inclined at the target point P may greatly differ from the angle $\theta_{PM}$ at which the target path M is inclined at the target point P, as shown in FIG. 3.

When this happens, the actual path along which the vehicle W runs gradually converges onto the target path M while oscillating largely across the target path M. Therefore, the vehicle W as it runs frequently changes its course of travel, and the actual path meanders across the target path M.

To eliminate the above drawback, it may be effective to select the target point P on the target path M as far away from the vehicle M as possible, i.e., to increase the x coordinate $x_P$ of the target point P (that is, to increase the predicted time T as $x_P = VT$).

This is because, as can be seen from FIG. 3, the farther the target point P is away from the vehicle W, the smaller the yaw rate $\gamma_P$ for bringing the vehicle W to the target point P, and hence the angle $\theta_{PW}$ of the vehicle W at the target point P.

However, in order to set the target point P as far away from the vehicle M as possible, it is also necessary to determine the target path M over a distance as remote from the vehicle W as possible. If the vehicle W runs at high speed, the distance of the target path M to be set is very large.

Since the target path M is actually determined based on the image information in front of the vehicle W, produce by the imaging device, there is a certain limitation on the distance of the target path M that can be set.

For the reasons described above, it is difficult to control the vehicle W to follow the target path M along a smooth path especially when the vehicle W is running in a high-speed range.

SUMMARY OF THE INVENTION

It is an object of the present invention to provide a system for controlling a mobile body to run while following a target path along a smooth path, for moving the mobile body substantially along the target path, so that the mobile body can smoothly follow the target path especially when it is running in a high-speed range.

To achieve the above object, there is provided in accordance with the present invention a system for controlling a mobile body to move substantially along a target path, comprising means for determining a target point on the target path, means for determining a control quantity to reach the target point to cause the mobile body to reach the target point from an optional position, means for determining a direction in which the mobile body moves at the target point based on the control quantity to reach the target point, means for determining an angular difference between the direction and the target path at the target point as a target point angular difference, means for determining a target control quantity for the mobile body by correcting the control quantity to reach the target point based on the target point angular difference, and means for controlling the mobile body based on the target control quantity.

The means for determining a target control quantity comprises means for determining a target control quantity using a condition quantity of the target path.

The condition quantity of the target path is a curvature and width of the target path, the arrangement being such that the control quantity to reach the target point is corrected into the target control quantity by an amount which is smaller as the curvature is greater and is greater as the width is greater.

The means for determining a target control quantity comprises means for determining a target control quantity using a condition quantity of the mobile body.

The condition quantity of the mobile body is a speed of the mobile body, the arrangement being such that the control quantity to reach the target point is corrected into the target control quantity by an amount which is greater as the speed is higher.

The control quantity to reach the target point to bring the mobile body to the target point on the target path is basically determined by the relative positional relationship between the mobile body and the target point on the target path. Since the target control quantity is determined by correcting the control quantity to reach the target point based on the target point angular difference between the mobile body and the target path, the target control quantity is determined taking into account the directional relationship between the mobile body and the target path in addition to the relative positional relationship between the mobile body and the target path. Therefore, when the mobile body is controlled based on the target control quantity, the mobile body can be moved in directionally following the target path as well as positionally following the target path.

If the amount to correct the control quantity to reach the target point into the target control quantity based on the target point angular difference is relatively small, then it is possible to move the mobile body quickly to the target path thus improving the ability of the mobile body to positionally follow the target path. If the amount to correct the control quantity to reach the target point into the target control quantity is relatively small, then the ability of the mobile body to directionally follow the target path can be improved.

When correcting the control quantity to reach the target point to determine the target control quantity, it is preferable to determine the target control quantity using condition quantities of the target path such as its curvature and width, and a condition quantity of the mobile body such as its speed.

In determining the target control quantity using the curvature and width of the target path, it is preferable to reduce the amount to correct the control quantity to reach the target point into the target control quantity as the curvature is greater, and to increase the amount to correct the control quantity to reach the target point into the target control quantity as the width is greater.

This is because it is preferable to move the mobile body more quickly toward the target path, i.e., to improve the ability of the mobile body to positionally follow the target path, as the curvature of the target path is greater, and also because it is preferable to improve the ability of the mobile body to directionally follow the target path for enabling the mobile body to follow the target path along a smoother path as the width of the target path is greater.

In determining the target control quantity using the speed of the mobile body, it is preferable to increase the amount to correct the control quantity to reach the target point into the target control quantity as the speed of the mobile body is higher.

This is because it is preferable to improve the ability of the mobile body to directionally follow the target path for enabling the mobile body to follow the target path along a smoother path as the speed of the mobile body is higher.

The principles of the present invention are applicable to an automatic running vehicle such as an automobile or the like. In the automatic running vehicle, the yaw rate produced on the vehicle may be used as the control quantity of the mobile body.

Since the yaw rate on the vehicle and the steering angle of steerable wheels of the vehicle have a certain relationship to each other, once a target yaw rate is finally determined, it is possible to determine a target steering angle to obtain the target yaw rate, and the steerable wheels may be steered to achieve the target steering angle than determined.

To determine the target control quantity, an amount to correct the yaw rate which is required to eliminate the target point angular difference is multiplied by a corrective coefficient having a value ranging from 0 to 1 depending on the curvature and width of the target path and the speed of the mobile body, to determine an amount to correct a yaw rate to reach the target point as the control quantity to reach the target point into a target yaw rate as the target control quantity. As the corrective coefficient is greater, i.e., closer to 1, the amount to correct the yaw rate to reach the target point into the target yaw rate is greater. Therefore, the ability of the automatic running vehicle to directionally follow the target path is improved. As the corrective coefficient is smaller, i.e., closer to 0, the amount to correct the yaw rate to reach the target point into the target yaw rate is smaller. Therefore, the ability of the automatic running vehicle to positionally follow the target path is improved.

In order to determine the amount to correct the yaw rate to reach the target point into the target yaw rate depending on the curvature and width of the target path and the speed of the automatic running vehicle, the corrective coefficient may be determined according to a fuzzy reasoning process, for example.

In an automatic running vehicle, generally, the steering angle suffers a response delay when steering the steerable wheels, and the yaw rate on the vehicle also suffers a response delay in response to the steering angle. Therefore, even when the steerable wheels are steered to produce the target yaw rate, there is generally produced a response delay which affects the direction in which the automatic running vehicle moves at the target point on the target path.

By taking into account the response characteristics of the steering angle and the response characteristics of the yaw rate with respect to the steering angle, therefore, it is possible to determine the direction in which the automatic running vehicle moves at the target point in a manner to match actual vehicle conditions.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 7(a), 7(b), and 7(c) are block diagrams of a system configuration of the automatic running system;

DETAILED DESCRIPTION OF THE PREFERRED EMBODIMENT

Figure 1:
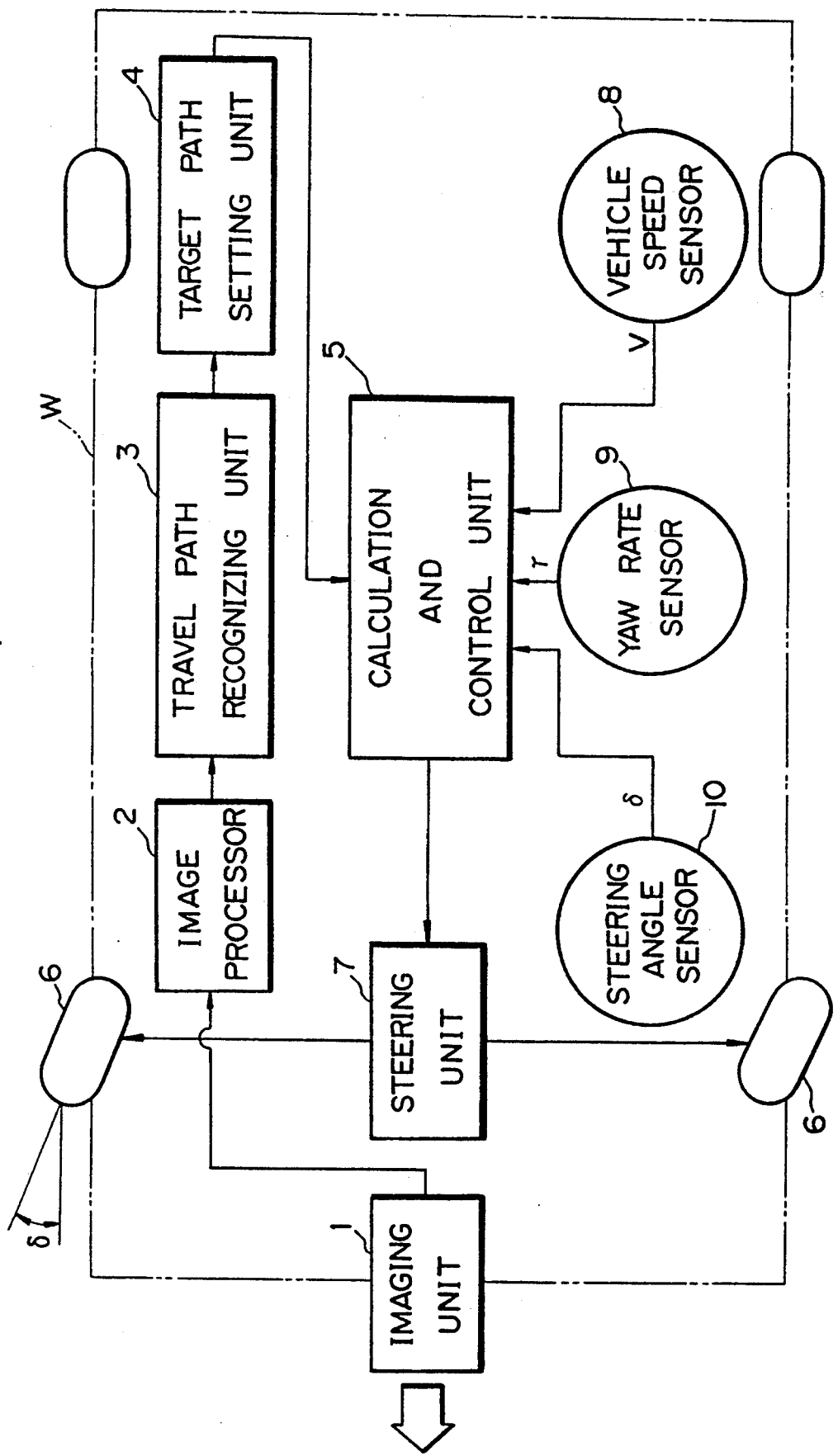
FIG. 1 is a block diagram of an automatic running vehicle which incorporates a control system according to the present invention.

As shown in FIG. 1, an automatic running vehicle (mobile body) W which incorporates a control system according to the present invention is illustrated as being based on an ordinary four-wheeled automobile having steerable front wheels 6. The control system includes an imaging unit 1 for producing image information of a road or the like in front of the vehicle W, an image processor 2 for processing the image information produced by the imaging unit 2, a travelable path recognizing unit 3 for recognizing a travelable path range in which the vehicle W can travel, from the processed information from the image processor 2, a target path setting unit 4 for establishing a target path for the vehicle W to run along, in the travelable path range, a calculation and control unit 5 for carrying out various calculations and a control process (described later on), a steering unit 7 for steering the steerable front wheels 6, a vehicle speed sensor 8 for detecting the vehicle speed V of the vehicle W, a yaw rate sensor 9 for detecting the yaw rate $\gamma$ of the vehicle W, and a steering angle sensor 10 for detecting the steering angle $\delta$ of the steerable front wheels 6, i.e., the angle through which the steerable front wheels 6 have been steered.

The imaging unit 1 comprises a video camera or the like, and the image processor 2, the travelable path recognizing unit 3, the target path setting unit 4, and the calculation and control unit 5 are in the form of a microcomputer or the like. The steering unit 7 comprises an ordinary steering mechanism and an actuator for actuating the steering mechanism.

Image processing operation carried out by the image processor 2, the travelable path recognizing unit 3, and the target path setting unit 4 is of known nature as disclosed in Japanese laid-open patent publication No. 2-027688, for example. Basically, the image processing operation extracts road line segments from the image information generated by the imaging unit 1, two-dimensionally recognizes a travelable path range from the extracted road line segments, and establishes a target path in the travelable path range according to predetermined rules, e.g., establishes a target path centrally in the travelable path range.

Figure 3:
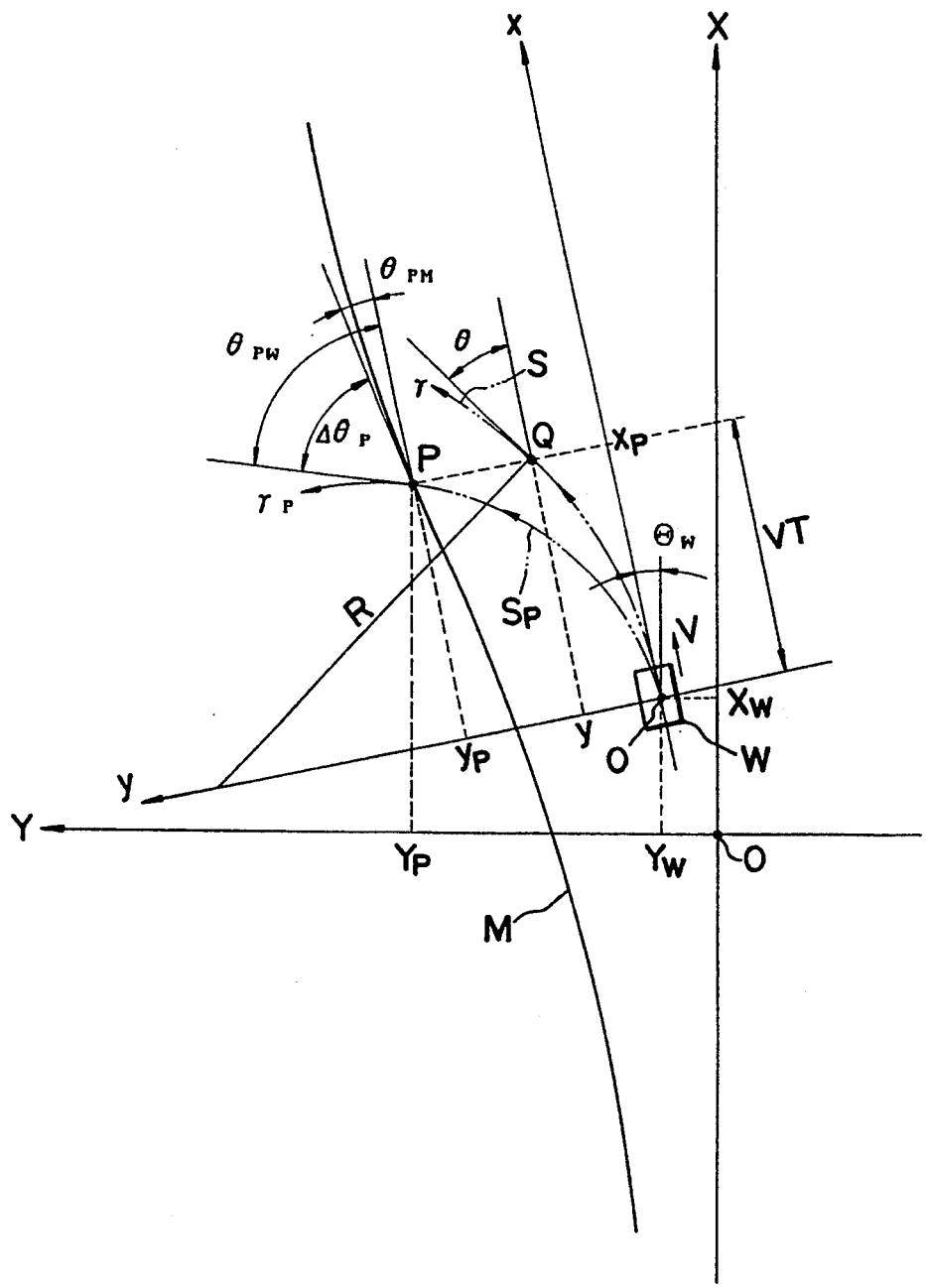
FIG. 3 is a diagram showing the manner in which the automatic running vehicle operates.

As shown in FIG. 3, the target path may be expressed as a curve M composed of a series of dots in an x-y coordinate system that has an origin 0 on the vehicle W, an x-axis aligned with the longitudinal axis of the vehicle W, and a y-axis aligned with the transverse axis of the vehicle W.

Figure 2:
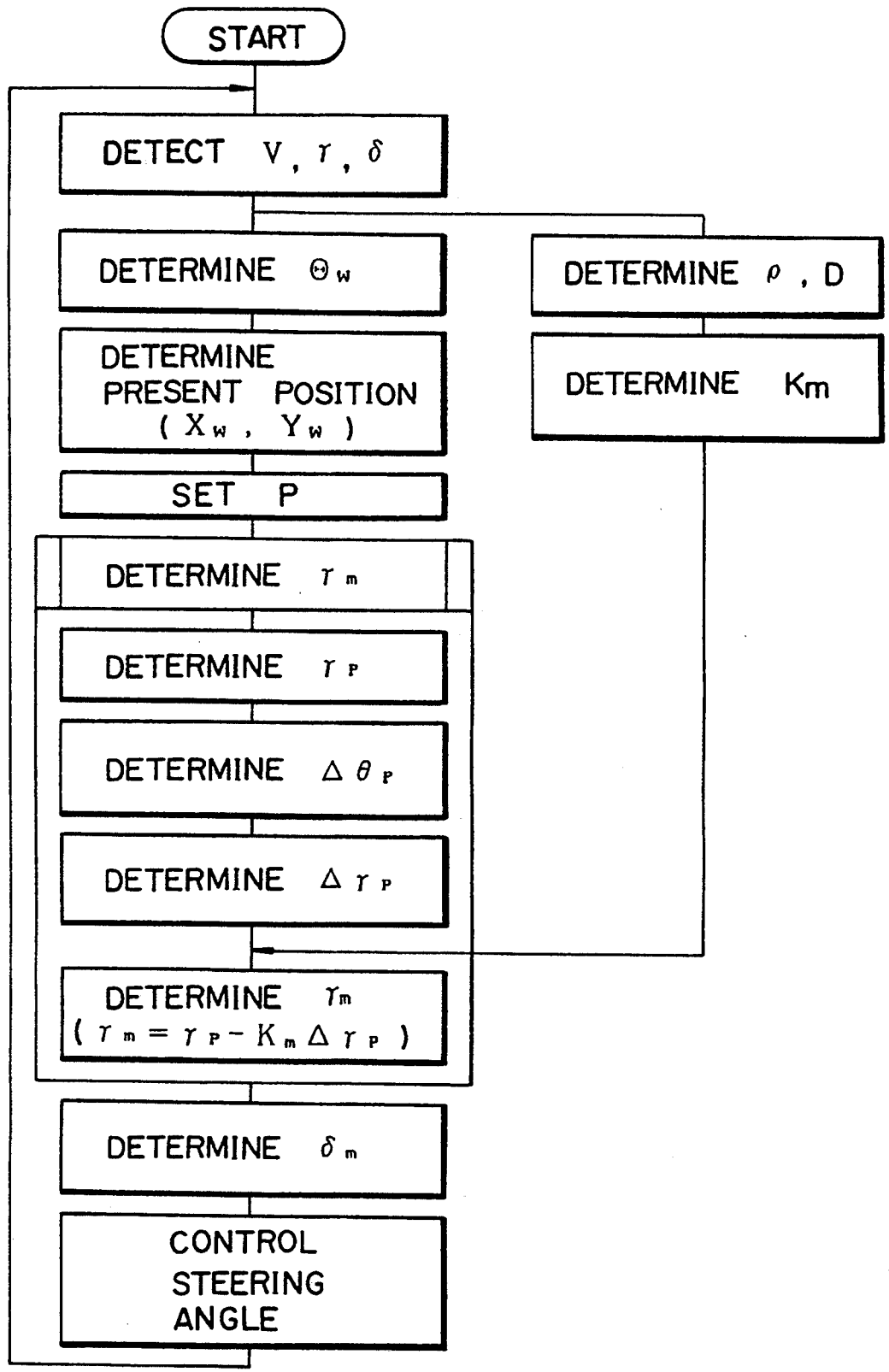
FIG. 2 is a flowchart of an operation sequence of the control system.

The calculation and control unit 5 effects predetermined calculations and a control process according to the flowchart shown in FIG. 2 after the target path setting unit 4 has established the target path. Basically, a target yaw rate (target control quantity) $\gamma_m$ for causing the vehicle W to run along the target path based on the vehicle speed V, the yaw rate $\gamma$, and the steering angle $\delta$ detected by the respective sensors 8, 9, 10 at each cycle time (e.g., 10 ms), and then a target steering angle $\delta_m$ is determined from the target yaw rate $\gamma_m$. Thereafter, the steering unit 7 is controlled to steer the steerable wheels 6 so that their actual steering angle $\delta$ becomes the target steering angle $\delta_m$. As described below, the calculation and control unit 5 comprises a means for determining a target point on the target path, a means for determining a yaw rate to reach the target point, i.e., a control quantity to reach the target point, a means for determining the direction in which the vehicle W runs at the target point, as an angle at which the vehicle W is inclined, a means for determining an angular difference between the vehicle W and the target path at the target point, i.e., a target point angular difference, and a means for determining a target yaw rate $\gamma_m$ as a target control quantity by correcting the yaw rate to reach the target point based on the target point angular difference. The steering unit 7 comprises a means for steering the steering wheels 6 based on the target yaw rate $\gamma_m$ determined by the calculation and control unit 5.

Now, the operation of the calculation and control unit 5 will be described in greater detail with reference to FIGS. 2 and 3.

It is assumed in FIG. 3 that the information about the road on which the vehicle W has been running, and image information (road information) newly obtained by the imaging unit 1 are processed in a fixed X-Y coordinate system that is assumed and fixed as when the control system is initialized, and that a target path M is established and the target path M and the vehicle W are positioned relatively to each other as shown in FIG. 3.

The calculation and control unit 5 first assumes, in the fixed X-Y coordinate system, a relative x-y coordinate system having an origin 0 on the vehicle W, an x-axis aligned with the longitudinal axis of the vehicle W, and a y-axis aligned with the transverse axis of the vehicle W.

In order to assume such a relative x-y coordinate system, it is necessary to determine the present position of the vehicle W in the fixed X-Y coordinate system, i.e., the coordinates ($X_W$, $Y_W$) of the origin 0 and the angle $\Theta_W$ at which the vehicle W is inclined in the fixed X-Y coordinate system.

Then, the calculation and control unit 5 establishes, in the relative x-y coordinate system, a target point on the target path M as with the conventional automatic running vehicle.

More specifically, the target point P is established as a point on the target path M which has an x coordinate that is the same as a distance $x_P(=VT)$ that is traversed when the vehicle W moves at a present vehicle speed V along the x-axis for a predetermined predicted time T.

In order to establish the target point P in the relative x-y coordinate system, it is necessary to express the target path M set in the fixed X-Y coordinate system as a series of dots in the relative coordinate system. This is carried out by transforming the coordinates (X, Y) of a point on the target path M in the fixed X-Y coordinate system into its coordinates (x, y) in the relative x-y coordinate system, using a known formula for coordinate transformation.

Such a known formula for coordinate transformation is as follows:

$$\begin{pmatrix} \cos\Theta_W & -\sin\Theta_W \\ \sin\Theta_W & \cos\Theta_W \end{pmatrix} \begin{pmatrix} x \\ y \end{pmatrix} = \begin{pmatrix} X - X_W \\ Y - Y_W \end{pmatrix}. \quad (4)$$

In this manner, with the target path M expressed as a series of dot in the relative x-y coordinate system, it is possible to set the target point P by searching for a point on the target path M whose x coordinate is $x_P=VT$.

The present vehicle speed V of the vehicle W which is required to set the target point P is detected by the vehicle speed sensor 8.

Then, as with the conventional automatic running vehicle, the calculation and control unit 5 determines the yaw rate $\gamma_P$ for bringing the vehicle W from the present position (origin 0) to the target point P, i.e., the yaw rate $\gamma_P$ to reach the target point, according to the equation (2):

$$\gamma_P = \frac{2V}{x_P^2} \cdot y_P = \frac{2}{VT^2} \cdot y_P \quad (2)$$

where $y_P$ is the y coordinate of the target point P in the relative x-y coordinate system. Using the Y coordinate $Y_P$ of the target point P in the fixed X-Y coordinate system, the y coordinate $y_P$ is expressed as follows:

If the target point P has coordinates $x_P$, $Y_P$ in the relative x-y coordinate system and coordinates $X_P$, $Y_P$ in the fixed X-Y coordinate system, then since $x_P=VT$ and from the equation (4) above, the following equation (6) is satisfied:

$$VT\sin\Theta_W + y\cos\Theta_W = Y_P - Y_W \quad (5).$$

Therefore, the y coordinate $y_P$ of the target point P is determined by:

$$y_P = \frac{Y_P - Y_W - VT\sin\Theta_W}{\cos\Theta_W}. \quad (6)$$

If it is assumed that the angle $\Theta_W$ of the vehicle W is sufficient small, then since $\sin\Theta_W \approx \Theta_W$ and $\cos\Theta_W \approx 1$, the equation (6) becomes:

$$y_P = Y_P - (Y_W + VT\Theta_W) \quad (7).$$

Then, the calculation and control unit 5 assumes that the vehicle W runs from the present position (origin 0) toward the target point P with the yaw rate $\gamma_P$ to reach the target point, i.e., the vehicle W travels along an imaginary path $S_P$ in FIG. 3, and determines the angle $\theta_{PW}$ at which the vehicle W is inclined at the target point P in the relative x-y coordinate system after it has traveled along the path $S_P$.

The angle $\theta_{PW}$ is determined as follows:

First, it is assumed in FIG. 3 that the vehicle W positioned in the origin 0 of the relative x-y coordinate system runs along an arcuate path S with a yaw rate $\gamma$.

When the vehicle W reaches a point Q after it has moved along the path S by a distance $x_P(=VT)$ in the x-axis direction, the angle $\theta$ at which the vehicle W is inclined in the relative x-y coordinate system and the radius R of the path S satisfy the following equation:

$$R\sin\theta = x_P = VT \quad (8)$$

Since the yaw rate $\gamma$ is an angular velocity, $R=V/\gamma$. When substituting it in the equation (8), the equation (8) can be modified as follows:

$$\theta = \sin^{-1}(\gamma T) \quad (9).$$

If the predicted time T is about 1 second, for example, then because $\gamma T \ll 1$ in reality, $\sin^{-1}(\gamma T) \approx \gamma T$. By substituting it in the equation (9), $$\theta \approx \gamma T \quad (10).$$

If the time in which the vehicle W reaches the point Q with the yaw rate $\gamma$ is represented by $t_q$, then the angle $\theta$ is indicated exactly by $\theta=\gamma t_q$. Comparison of this equation and the equation (10) shows that insofar as the predicted time T is relatively small, the time $t_q$ that is spent until the vehicle Q reaches the point Q is substantially equal to the predicted time T.

The above equation (10) is a general equation for determining the angle $\theta$ of the vehicle W in the position that is reached when the vehicle W moves from the origin 0 for the distance $x_p$ (=VT) in the x-axis direction. Therefore, the angle $\theta_{PW}$ of the vehicle W at the target point P that is reached when the vehicle W runs from the origin 0 to the target point P with the yaw rate $\gamma_P$ to reach the target point, is given by the following equation:

$$\theta_{PW}=\gamma_P T \quad (11).$$

After having determined the angle $\theta_{PW}$ of the vehicle W at the target point P, the calculation and control unit 5 determines the difference between the angle $\theta_{PW}$ and the angle $\theta_{PM}$ at which the target path M is inclined, i.e., an angle $\Delta\theta_P$ (target angle angular difference $\Delta\theta_P$) between the direction in which the vehicle W runs at the target point P and the target path M, according to the following equation:

$$\Delta\theta_P=\theta_{PW}-\theta_{PM} \quad (12).$$

Then, the calculation and control unit 5 determines a yaw rate corrective quantity $\Delta\gamma_P$ required to eliminate target angle angular difference $\Delta\theta_P$.

Specifically, since $\Delta\theta_P=\Delta\gamma_P T$ from the equation (10), it is put in the equation (12), and the equation (12) is then solved for $\Delta\gamma_P$ as follows:

$$\Delta\gamma_P = \frac{\Delta\theta_P}{T} = \frac{\theta_{PW} - \theta_{PM}}{T}, \quad (13)$$

thus determining the yaw rate corrective quantity $\Delta\gamma_P$.

In order to determine the yaw rate corrective quantity $\Delta\gamma_P$ according to the equation (13), it is necessary to determine beforehand the angle $\theta_{PM}$ of the target path M at the target point P in the relative x-y coordinate system. A process of determining the angle $\theta_{PM}$ will be described later on.

Then, the calculation and control unit 5 determines a target yaw rate $\gamma_m$ to direct the vehicle W along the target path M in the present position of the vehicle W according to the following equation:

$$\gamma_m=\gamma_P-K_m\Delta\gamma_P \quad (14).$$

Alternatively, the equations (2), (11), (13), and $x_p$=VT are substituted in the equation (14) to determine a target yaw rate $\gamma_m$ according to the following equation:

$$\gamma_m = \frac{2}{VT^2} \cdot y_P - \frac{K_m}{T}\left(\frac{2}{VT^2} \cdot y_P \cdot T - \theta_{PM}\right) \quad (15)$$

$$= \frac{2(1-K_m)}{VT^2} \cdot y_P + \frac{K_m}{T} \cdot \theta_{PM}$$

where $K_m$ in the equations (14), (15) is a corrective coefficient ranging from 0 to 1. The corrective coefficient $K_m$ is determined in a manner described later on.

The equation (14) or (15) has the following significance:

If $K_m=1$, for example, then $\gamma_m=\gamma_P-\Delta\gamma_P$. It is apparent from the definition of $\Delta\gamma_P$ that when the vehicle W runs from the present position with the target yaw rate $\gamma_m$, the angle $\theta$ of the vehicle W in the position reached after it has moved for the distance $x_P$ in the x-axis direction, i.e., the angle $\theta$ of the vehicle W after the predicted time T, agrees with the angle $\theta_{PM}$ of the target path M at the target position P, thus eliminating the angular difference $\Delta\theta_P$ between those angles. Generally, however, the vehicle W does not reach the target point P at this time.

If $K_m=0$, for example, then $\gamma_m=\gamma_P$. When the vehicle W runs with the target yaw rate $\gamma_m$, the vehicle W gets to the target point P after the predicted time T. Stated otherwise, the positional difference in the y-axis direction between the vehicle W and the target point P after the predicted time T is eliminated. Generally, however, the angle $\theta_{PW}$ of the vehicle W at the target point P and the angle $\theta_{PM}$ of the target path M do not agree with each other at this time.

Therefore, if the corrective coefficient $K_m$ is selected to be of a large value in the range from 0 to 1, then while the ability of the vehicle W to positionally follow the target path M in the y-axis direction (transverse direction thereof) is lowered, the ability of the vehicle W to directionally follow the target path M in the y-axis direction is increased. Conversely, if the corrective coefficient $K_m$ is selected to be of a small value in the range from 0 to 1, then while the ability of the vehicle W to directionally follow the target path M is lowered, the ability of the vehicle W to positionally follow the target path M is increased. If the corrective coefficient $K_m$ is selected to be of an intermediate value in the range from 0 to 1, then the ability of the vehicle W to both positionally and directionally follow the target path M is held to a satisfactory level to some extent. The term of $K_m\Delta\gamma_P$ in the equation (14) is indicative of a yaw rate corrective quantity needed to reduce the angular difference $\Delta\theta_P$ between the vehicle W and the target path M after the predicted time T with respect to the angular difference that occurs with the yaw rate $\gamma_P$ to reach the target point, except when $K_m=0$.

To determine the target yaw rate $\gamma_m$ according to the equation (14) or (15), the calculation and control unit 5 first determines a corrective coefficient $K_m$ depending on the curvature of the travelable path on which the target path M is established, the road width, and the vehicle speed V, and then determines the target yaw rate $\gamma_m$ using the corrective coefficient $K_m$ thus determined.

Thereafter, the calculation and control unit 5 determines a steering angle $\delta$ (hereinafter referred to as a target steering angle $\delta_m$) for the steerable wheels 6 to produce the target yaw rate $\gamma_m$ on the vehicle W.

Since the yaw rate $\gamma$ and the steering angle $\delta$ are related to each other according to the equation (3), the target steering angle $\delta_m$ can be determined by the following equation:

$$\delta_m = \frac{L(1+KV^2)}{V} \cdot \gamma_m. \quad (3)'$$

Alternatively, it is assumed that a yaw rate corrective quantity from the present yaw rate $\gamma$ to the target yaw rate $\gamma_m$ is represented by $\Delta\gamma_m$ ($\gamma_m-\gamma$), and a steering angle corrective quantity (hereinafter referred to as a target steering angle corrective quantity) from the present steering angle $\delta$ to the target steering angle $\delta_m$ is represented by $\Delta\delta_m$ ($\delta_m - \delta$). Then, since the following equation is satisfied from the equation (3):

$$\Delta\delta_m = \frac{L(1 + KV^2)}{V} \cdot \Delta\gamma_m, \tag{16}$$

the target steering angle $\delta_m$ can e determined according to the equation:

$$\delta_m = \delta + \Delta\delta_m = \delta + \frac{L(1 + KV^2)}{V} \cdot \Delta\delta_m. \tag{17}$$

The present yaw rate $\gamma$ and the steering angle $\delta$ are detected respectively by the yaw rate sensor 9 and the steering angle sensor 10.

In the equations (3)', (16), and (17), L rep resents the wheelbase of the vehicle W, and K the stability factor of the steering characteristics.

The calculation and control unit 5 supplies the target steering angle $\delta_m$ or the target steering angle corrective quantity $\Delta\delta_m$ to steering unit 7 (see FIG. 1), and enables the steering unit 7 to control the steerable wheels 6 so that the steering angle of the steerable wheels 6 becomes the target steering angle $\delta_m$. The above calculation and control process is repeated in predetermined cycle times.

The procedure for determining the present position of the vehicle W in the fixed X-Y coordinate system, i.e., the X and Y coordinates ($X_W$, $Y_W$) of the origin 0 of the relative x-y coordinate system, the angle $\Theta_W$, and the angle $\theta_{PM}$ of the target path M at the target point P in the operation of the calculation and control unit 5 will be described below with reference to FIG. 4.

Figure 4:
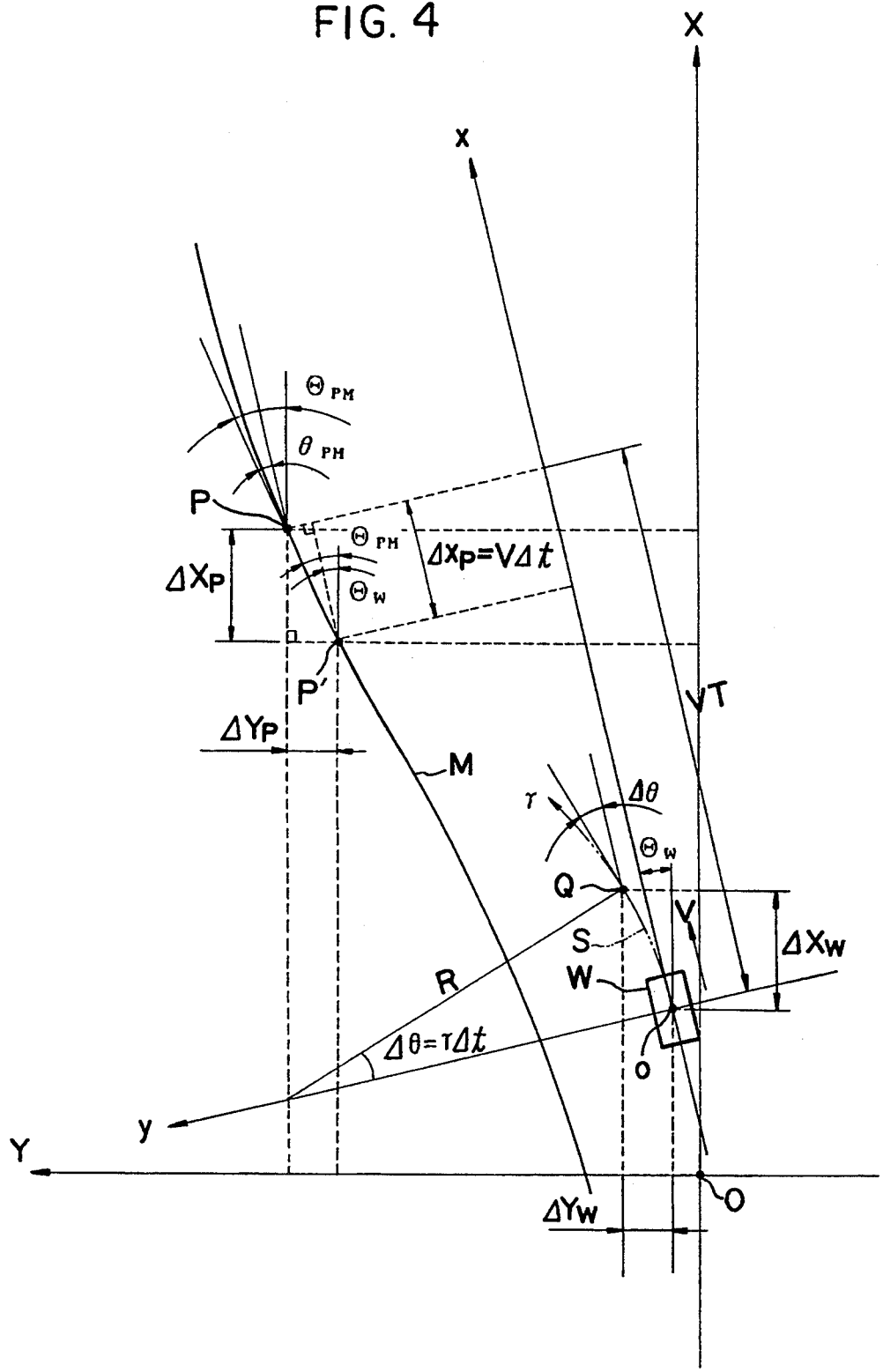
FIG. 4 is a diagram showing the manner in which the automatic running vehicle operates.

It is assumed that the vehicle W and the target path M are positioned relatively to each other as shown in FIG. 4, that the present yaw rate of the vehicle W is $\gamma$ and the vehicle speed is V, and that the vehicle W runs to a point Q within a cycle time in which the above calculations and the control process are carried out.

If the cycle time is sufficiently small, then the yaw rate $\gamma$ of the vehicle W and the vehicle speed V are regarded as remaining unchanged, and the vehicle W runs from the present position to the point Q along an arcuate path W having a radius R of curvature that is determined depending on the yaw rate $\gamma$.

If the change in the angle of the vehicle W until it reaches the point Q is indicated by $\Delta\theta$, then the change $\Delta\theta$ is equal to the angle through which the vehicle W turns on the path S when it moves from the present position to the point Q. If the cycle time is indicated by $\Delta t$, then the change $\Delta\theta$ is given by:

$$\Delta\theta = \gamma \Delta t \tag{18}$$

Accordingly, if the control system is initialized such that the relative x-y coordinate system with respect to the vehicle W and the fixed X-Y coordinate system are equalized to each other when the vehicle W is at rest, then the angle $\Theta_W$ of the vehicle W in the fixed X-Y coordinate system can be determined by integrating the yaw rate $\gamma$ in each cycle time $\Delta t$.

Thus, the angle $\Theta_W$ is expressed as follows:

$$\Theta_W = \int_0^t \gamma dt. \tag{19}$$

If the present angle $\Theta_W$ of the vehicle W is indicated by $\Theta_W$, then since X and Y coordinates of the vehicle speed V in the fixed X-Y coordinate system are $V\cos\Theta_W$, $V\sin\Theta_W$, respectively, a displacement $\Delta X_W$ of the vehicle W in the X-axis direction and a displacement $\Delta Y_W$ of the vehicle W in the Y-axis direction within the cycle time $\Delta t$ are expressed as follows:

$$\Delta X_W = V\cos\Theta_W \cdot \Delta t \tag{20},$$

$$\Delta Y_W = V\sin\Theta_W \cdot \Delta t \tag{21}.$$

Insofar as the relative x-y coordinate system with respect to the vehicle W and the fixed X-Y coordinate system are equalized to each other when the vehicle W is at rest, as described above, the X and Y coordinates of the vehicle W in the fixed X-Y coordinate system are determined by integrating (cumulating) the coordinates $V\cos\Theta_W$, $V\sin\Theta_W$ in respective cycle times $\Delta t$.

That is, the X coordinate $X_W$ and Y coordinate $Y_W$ of the vehicle W are determined as follows:

$$X_W = \int_0^t V\cos\Theta_W dt, \tag{22}$$

$$Y_W = \int_0^t V\sin\Theta_W dt. \tag{23}$$

The angle $\Theta_W$ may be of a value that is determined according to the equation (19).

If the angle $\Theta_W$ is sufficiently small, then since $\cos\Theta_W \approx 1$, $\sin\Theta_W \approx \Theta_W$, the equations (22), (23) are modified as follows:

$$X_W = \int_0^t V dt, \tag{24}$$

$$Y_W = \int_0^t V\Theta_W dt. \tag{25}$$

The angle $\theta_{PM}$ of the target path M at the target point P in the relative x-y coordinate system is determined in the manner described below:

If the target point produced by the above calculation and control process with respect to the present position of the vehicle W is represented by P and the target position in the preceding calculation and control cycle is represented by P' then the target points P, P' are considered to be sufficiently close to each other provided the cycle time $\Delta t$ is sufficiently small.

As a consequence, if it is assumed that the displacement from the target point P' to the target point P in the X-axis direction is $\Delta X_P$, the displacement from the target point P' to the target point P in the Y-axis direction is $\Delta Y_P$, and the angle of the target path M at the target point P in the fixed X-Y coordinate system is $\Theta_{PM}$, then the following equation is approximately satisfied:

$$\tan\Theta_{PM} = \frac{\Delta Y_P}{\Delta X_P}. \tag{26}$$

As described above, the target point P is set as a point on the target path M which has an x coordinate of VT in the relative x-y coordinate system with reference to the present position of the vehicle W, and the target point P' is a point on the target path M which has an x coordinate of VT in the relative x-y coordinate system with reference to the present position of the vehicle W at a time that precedes the present time by the cycle time $\Delta t$. Within the cycle time $\Delta t$ that is sufficiently small, any change in the angle of the vehicle W may be ignored as being sufficiently small.

Therefore, in the relative x-y coordinate system with reference to the present position of the vehicle W, a displacement $\Delta x_P$ from the target point P' to the target point P in the x-axis direction is approximately given by:

$$\Delta x_P = V\Delta t \qquad (27).$$

If the present angle of the vehicle W in the fixed X-Y coordinate system is $\Theta_W$ as shown in FIG. 4, then the following equation is satisfied:

$$\Delta X_P = \frac{\Delta x_P}{\cos(\Theta_{PM} - \Theta_W)} \cdot \cos\Theta_{PM}. \qquad (28)$$

The denominator of the equation (28) is expanded according to the addition theorem, and then the denominator and numerator thereof are divided by $\cos\Theta_{PM}$. By then substituting the equation (27), the following equation results:

$$\Delta X_P = \frac{V\Delta t}{\cos\Theta_W + \tan\Theta_{PM} \cdot \sin\Theta_W}. \qquad (29)$$

Then, the equations (26) and (29) are solved as simultaneous equations for $\tan\Theta_{PM}$, which is given as follows:

$$\tan\Theta_{PM} = \frac{\Delta Y_P \cos\Theta_W}{V\Delta t - \Delta Y_P \sin\Theta_W}. \qquad (30)$$

From the equation (30) there can be determined the angle $\Theta_{PM}$ of the target path M at the target point P in the fixed X-Y coordinate system. Since the angle $\theta_{PM}$ of the target path M at the target point P in the relative x-y coordinate system is the difference between the angle $\Theta_{PM}$ and the angle $\Theta_W$ of the vehicle W, it can be determined by the following equation:

$$\theta_{PM} = \Theta_{PM} - \Theta_W \qquad (31).$$

If $\Theta_W$, $\Theta_{PM}$, $\Delta Y_P$ in the equation (30) are sufficiently small, then since $\tan\Theta_{PM} \approx \Theta_{PM}$, $\cos\Theta_W \approx 1$, $V\Delta t >> \Delta Y_P \sin\Theta_W$, the equation (30) becomes:

$$\Theta_{PM} = \frac{1}{V} \cdot \frac{\Delta Y_P}{\Delta t}. \qquad (30)'$$

Therefore, the angle $\Theta_{PM}$ can be determined by differentiating the Y coordinate of the target point P in the fixed X-Y coordinate system with respect to time, and dividing the differential by the vehicle speed V. That is the $\Theta_{PM}$ is given by:

$$\Theta_{PM} = \frac{1}{V} \cdot \frac{dY_P}{dt}. \qquad (32)$$

FIG. 2 shows a flowchart of the above operation sequence of the calculation and control unit 5 for carrying out the above calculation and control process.

The procedure for determining the corrective coefficient $K_m$ that is needed in the determination of the target yaw rate $\gamma_m$ and the target steering angle $\delta_m$ will be described below with reference to FIGS. 2, 5, and 6.

As described above, the corrective coefficient $K_m$ is a factor which affects the ability of the vehicle W to positionally and directionally follow the target path. The greater the corrective coefficient $K_m$, the higher the ability of the vehicle W to positionally follow the target path. The smaller the corrective coefficient $K_m$, the higher the ability of the vehicle W to directionally follow the target path.

Therefore, it is preferable to determine the corrective coefficient $K_m$ depending on the conditions of the travelable path on which the target path is to be established and also the running conditions of the vehicle W. Particularly, the corrective coefficient $K_m$ should preferably be determined depending on the curvature and road width of the travelable path ahead of the vehicle W and also the vehicle speed V of the vehicle W.

The reasons for the above determination of the corrective coefficient $K_m$ are as follows: As the curvature of the travelable path is greater, it is curved to a larger extent ahead of the vehicle W. Therefore, it is preferable to cause the vehicle W to quickly follow the target path established on the travelable path, and hence to set the corrective coefficient $K_m$ to a smaller value for higher ability of the vehicle W to positionally follow the target path.

As the curvature of the travelable path is smaller, the travelable path and the target path established thereon are more straight. Thus, it is preferable to cause the vehicle W to smoothly follow the target path rather than quickly follow the target path, and hence to set the corrective coefficient $K_m$ to a larger value for higher ability of the vehicle W to directionally follow the target path.

If the road width of the travelable path is smaller, then it is preferable to cause the vehicle W to quickly follow the target path established on the travelable path, and hence to set the corrective coefficient $K_m$ to a smaller value for higher ability of the vehicle positionally follow the target path.

If the road width of the travelable path is larger, then it is preferable to cause the vehicle W to smoothly follow the target path rather than quickly follow the target path, and hence to set the corrective coefficient $K_m$ to a larger value for higher ability of the vehicle W to directionally follow the target path.

If the vehicle speed V is higher, then it is preferable to cause the vehicle W to smoothly follow the target path, and hence to set the corrective coefficient $K_m$ to a larger value for higher ability of the vehicle W to directionally follow the target path.

If the vehicle speed V is lower, then it is preferable to set the corrective coefficient $K_m$ while maintaining an adequate balance between itself and the curvature and road width of the travelable path.

As shown in the flowchart of FIG. 2, the calculation and control unit 5 first determines the curvature $\rho$ and road width D of the travelable path concurrent with the above calculation and control process, and then determines the corrective coefficient $K_m$ from the curvature $\rho$, the road width D, and the vehicle speed V detected by the vehicle speed sensor 8, using a known fuzzy reasoning process.

Figure 5:
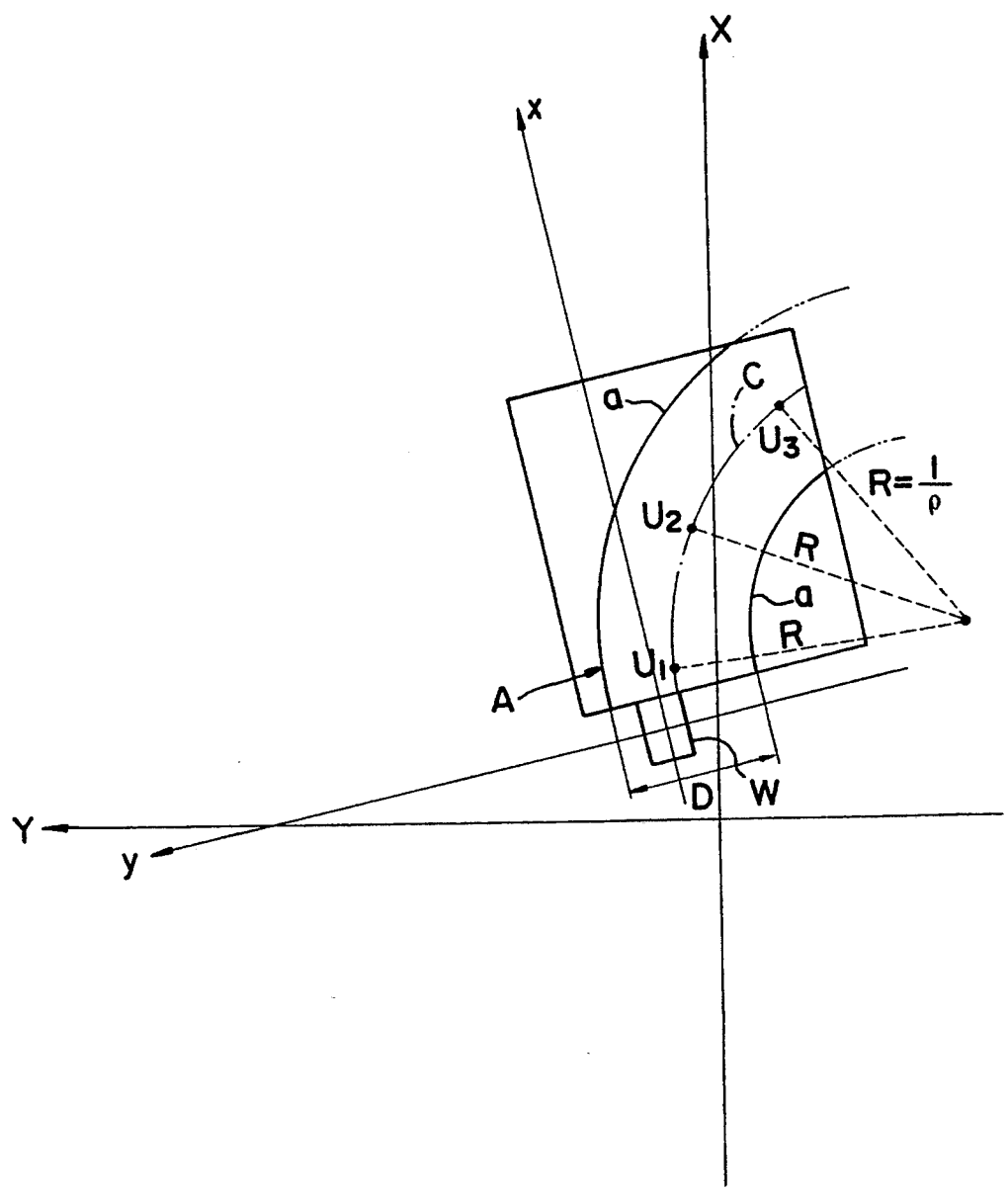
FIG. 5 is a diagram showing the manner in which the automatic running vehicle operates.

The curvature ρ and road width D of the travelable path are determined based on image data of the travelable path recognized by the travelable path recognizing unit 3 (see FIG. 1), as follows:

If a travelable path range (travelable path) A is recognized with respect to the vehicle W in the fixed X-Y coordinate system as shown in FIG. 5, then the road width D is determined as the distance between a pair of road line segments a that defines the travelable path A at a position closest to the vehicle W.

The curvature ρ is determined as the reciprocal of a radius R of an arc C that passes through points $U_1$, $U_2$, $U_3$ which are extracted on the center of the travelable path A.

The road width D may be determined by measuring the distances between the road segments a, a of the travelable path A at several locations, and averaging the distances.

The curvature ρ may be determined by extracting three points on one of the road segments a or three points on the target path established on the travelable path A, and finding the curvature of an arc that passes through the extracted three points.

The corrective coefficient $K_m$ is determined from the curvature ρ, the road width D, and the vehicle speed V using the known fuzzy reasoning process as follows: First, as shown in FIGS. 6(a) through 6(d), membership functions of the curvature ρ, the road width D, the vehicle speed V, and the corrective coefficient $K_m$ are established, and fuzzy rules are determined as indicated by Table 1 below:

TABLE 1

| Rule No. | Former part | | | Latter part |
| --- | --- | --- | --- | --- |
| | Curvature | Road width | Vehicle speed | |
| 1 | PS | PS | PS | PM |
| 2 | PS | PS | PM | PM |
| 3 | PS | PS | PB | PM |
| 4 | PS | PM | PS | PM |
| 5 | PS | PM | PM | PB |
| 6 | PS | PM | PB | PB |
| 7 | PS | PB | PS | PB |
| 8 | PS | PB | PM | PB |
| 9 | PS | PB | PB | PB |
| 10 | PM | PS | PS | PS |
| 11 | PM | PS | PM | PM |
| 12 | PM | PS | PB | PB |
| 13 | PM | PM | PS | PM |
| 14 | PM | PM | PM | PM |
| 15 | PM | PM | PB | PB |
| 16 | PM | PB | PS | PB |
| 17 | PM | PB | PM | PB |
| 18 | PM | PB | PB | PB |
| 19 | PB | PS | PS | PS |
| 20 | PB | PS | PM | PS |
| 21 | PB | PS | PB | PM |
| 22 | PB | PM | PS | PS |
| 23 | PB | PM | PM | PS |
| 24 | PB | PM | PB | PM |
| 25 | PB | PB | PS | PM |
| 26 | PB | PB | PM | PM |
| 27 | PB | PB | PB | PM |

The fuzzy rules in Table 1 basically match the preferred relationships between the corrective coefficient $K_m$, the curvature ρ, the road width D, and the vehicle speed V.

The calculation and control unit 5 then effects reasoning calculations from the curvature ρ, the road width D, and the vehicle speed V based on the membership functions and the fuzzy rules according to the so-called "MAXMIN method," and the corrective coefficient $K_m$ is determined from the result of reasoning according the so-called "center-of-gravity method."

Figure 6A:
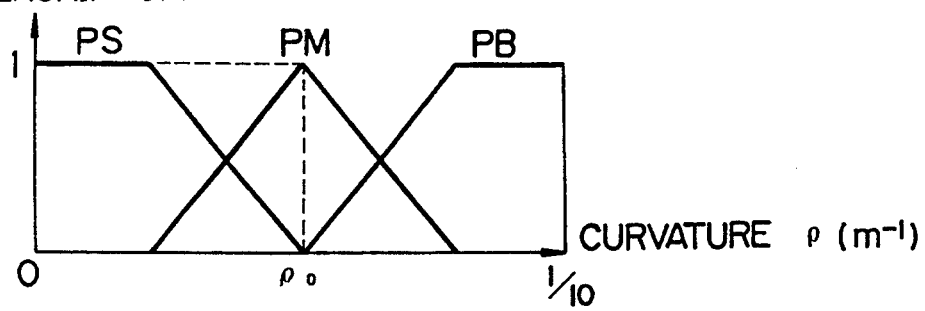
FIGS. 6(a) through 6(d) are diagrams showing the manner in which the automatic running vehicle operates.
Figure 6B:
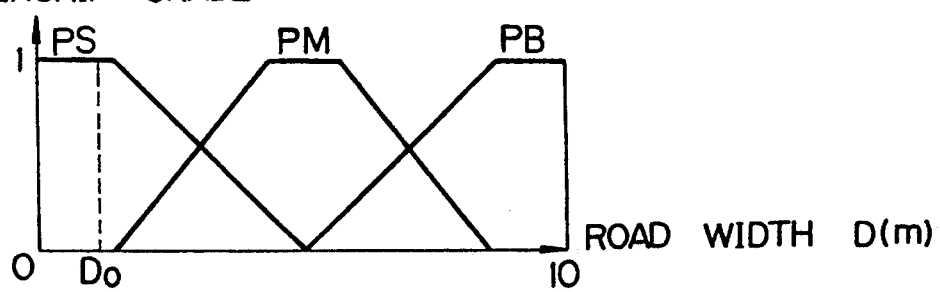
Figure 6C:
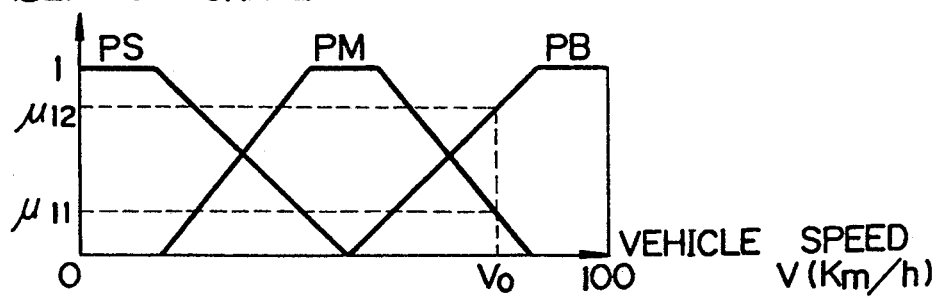
Figure 6D:
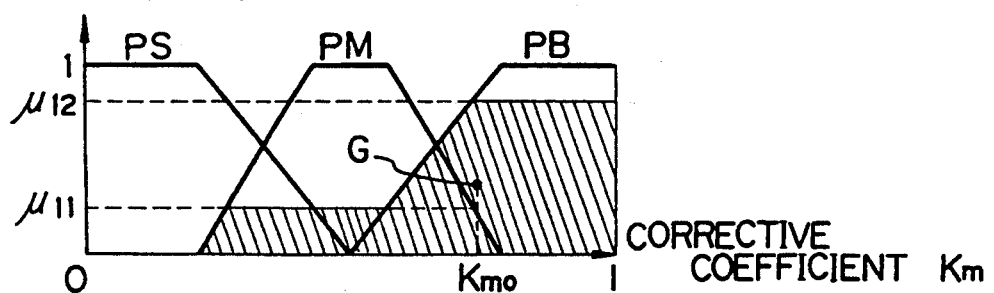

More specifically, if the curvature ρ and the road width D which are determined are of values $ρ_0$, $D_0$, respectively, and the detected vehicle speed V is of a value $V_0$, as shown in FIGS. 6(a) through 6(c), then the goodnesses of fit in the fuzzy rules Nos. 11, 12 in Table 1 are $μ_{11}$, $μ_{12}$, respectively, and the goodnesses of fit in the other fuzzy rules are "0". Therefore, the result of reasoning is obtained as a hatched area in FIG. 6(d). By determining the position of the center of gravity G in the hatched area, a specific value "$K_{m0}$" of the corrective coefficient $K_m$ is determined which depends on the curvature $ρ_0$, the road width $D_0$, and the vehicle speed $V_0$.

The system configuration of the automatic running vehicle described above is shown in the block diagrams of FIGS. 7(a) through 7(c) using transfer functions of Laplace transform.

The block diagram of FIG. 7(a) shows the automatic running vehicle as a system for receiving, as an initial stage input, the Y coordinate $Y_P$ of the target point P in the fixed X-Y coordinate system, and producing, as a final output, the Y coordinate $Y_W$ of the present position of the vehicle W. The system includes an adder/subtractor 11 for determining the y coordinate $y_P$ of the target point P in the relative x-y coordinate system according to the equation (7) (an approximation of the equation (6)), a differential transfer unit 12 for differentiating the Y coordinate $Y_P$ of the target point P according to the equation (32) (an approximation of the equation (30) to determine and output the angle $Θ_{PM}$ of the target path M at the target point P, an adder/subtractor 13 for subtracting the angle $Θ_W$ of the vehicle W from the angle $Θ_{PM}$ of the target path M to determine the angle $θ_{PM}$ of the target path M at the target point P, a transfer unit 14 for determining and outputting the target yaw rate $γ_m$ from the angle $θ_{PM}$ and the y coordinate $y_P$ of the target point P according to the equation (15), an adder/subtractor 15 for subtracting the present yaw rate γ from the target yaw rate $γ_m$ to determine the yaw rate target corrective quantity $Δγ_m$ ($=γ_m-γ$), a transfer unit 16 for determining the steering angle target corrective quantity $Δδ_m$ from the yaw rate target corrective quantity $Δγ_m$ according to the equation (16), an adder/subtractor 17 for adding the present steering angle δ to the steering angle target corrective quantity $Δδ_m$ to determine the target steering angle $δ_m$, a transfer unit 18 corresponding to the steering mechanism for producing the actual steering angle δ in response to the target steering angle $δ_m$, a transfer unit 19 corresponding to the entire vehicle for outputting the actual yaw rate γ in response to the actual steering angle δ, an integral transfer unit 20 for integrating the actual yaw rate γ according to the equation (19) to determine and output the angle $Θ_W$ of the vehicle W, an integral transfer unit 21 for integrating the angle $Θ_W$ according to the equation (25) (an approximation of the equation (23)) to determine and output the Y coordinate $Y_W$ of the present position of the vehicle W, a transfer unit 22 for determining and outputting the value of the second term in the parentheses in the equation (7) in response to the angle $Θ_W$, and an adder/subtractor 23 for adding the Y coordinate $Y_W$ of the present position of the vehicle W and the output from the transfer unit 22 according to the parentheses in the equation (7), and outputting the result to the adder/subtractor 11.

The transfer units 12, 14, ... are allotted respective transfer functions representing their input/output characteristics. These transfer functions are indicated by reverse functions using Laplace operator s in the known Laplace transformation.

Except those corresponding to the transfer units 18, 19, these transfer functions are expressed by reverse functions of the equations (32), (15), ... corresponding to the transfer units 12, 14, .... The transfer functions corresponding to the transfer units 18, 19 are determined taking into account the mechanical characteristics of the steering mechanism and the vehicle system as described below.

The transfer unit 18 corresponding to the steering mechanism produces a response delay of the output steering angle (actual steering angle) $\delta$ in response to the input steering angle (target steering angle) $\delta_m$ generally due to a mechanical delay of the steering mechanism. The response delay is indicated by an exponential function that is defined by a time constant $T_d$ (hereinafter referred to as a steering angle time constant $T_d$) inherent in the steering mechanism.

As well known in the art, the transfer function which represents such response delay is expressed as $1/(1+sT_d)$ using Laplace operator s. This transfer function corresponds to the transfer unit 18.

In the transfer unit 19 corresponding to the vehicle system, the output (actual yaw rate) $\gamma$ produced in response to its input (actual steering angle) $\delta$ does not instantaneously become the yaw rate determined according to the equation (3) relative to the steering angle and the yaw rate, but suffers a response delay owing to the inertial force of the vehicle W and other factors. As with the transfer unit 18, this response delay is indicated by an exponential function that is defined by a time constant $T_r$ (hereinafter referred to as a yaw time constant $T_r$) inherent in the vehicle system.

Therefore, the transfer function corresponding to the transfer unit 19 is composed of a transfer function $V/\{L(1+KV^2)\}$ which converts its input $\delta$ into a yaw rate according to the equation (3), and a transfer function $1/(1+sT_r)$ which expresses a response delay with respect to the yaw rate.

The block diagram of FIG. 7(b) shows some of the elements of the block diagram of FIG. 7(a). A transfer unit 24 shown in FIG. 7(b) corresponds to the transfer units 17~19 in FIG. 7(a).

The transfer unit 24 serves to receive the target yaw rate $\gamma_m$ as an input and output the actual yaw rate $\gamma$, and its input/output characteristics are indicated by a transfer function shown in FIG. 7(b).

The block diagram of FIG. 7(c) shows all the elements of the block diagram of FIG. 7(b) as one transfer unit 25 which receives the Y coordinate $Y_P$ of the target point P as an input and outputs the Y coordinate $Y_W$ of the present position of the vehicle W. The transfer unit 25 has its input/output characteristics indicated by a transfer function shown in FIG. 7(c).

Simulation processes effected on the automatic running vehicle will be described below with reference to FIGS. 8(a)~8(c) through 12(a)~12(c). FIGS. 8(a)~8(c) through 12(a)~12(c) illustrate the results of the simulation processes.

Based on the transfer function 25 shown in FIG. 7(c), the inventor effected simulation processes on the vehicle W to see how the path traced by the vehicle W follows the target path under various conditions including the predicted time T.

The various conditions in the simulation processes are as follows:

The target path M was straight, parallel to the X-axis of the fixed X-Y coordinate system (see FIG. 3), and the vehicle W started running in the X-axis direction from the origin of the fixed X-Y coordinate system.

The corrective coefficient $K_m$ was constant in each of the simulation processes.

Various values including the predicted time T that were necessary for the simulation processes are given in Table 2 below.

TABLE 2

| FIG. No. | | T | $T_d$ | $T_r$ | $K_m$ |
|---|---|---|---|---|---|
| 8 | (a) | 1 sec | 0.3 | 0.2 | 0 |
|  | (b) | " | " | " | 0.5 |
|  | (c) | " | " | " | 0.9 |
| 9 | (a) | 0.8 sec | " | " | 0 |
|  | (b) | " | " | " | 0.5 |
|  | (c) | " | " | " | 0.9 |
| 10 | (a) | 1 sec | " | 0.1 | 0 |
|  | (b) | " | " | " | 0.5 |
|  | (c) | " | " | " | 0.9 |
| 11 | (a) | 0.8 sec | " | " | 0 |
|  | (b) | " | " | " | 0.5 |
|  | (c) | " | " | " | 0.9 |
| 12 | (a) | 1 sec | 0.5 | 0.2 | 0 |
|  | (b) | " | " | " | 0.5 |
|  | (c) | " | " | " | 0.9 |

In each of the simulation processes shown in FIGS. 8(a), 9(a), 10(a), 11(a), and 12(a), the corrective coefficient $K_m$ had a value of "0". In these simulation processes, as can be seen from the equation (14) above, the target yaw rate $\gamma_m$ agrees with the yaw rate $\gamma_P$ to cause the vehicle W to get to the target point P. Therefore, these simulation processes are basically the same as the control process for controlling the conventional automatic running vehicle.

As can be seen from FIGS. 8(a), 9(a), 10(a), 11(a), and 12(a), the conventional automatic running vehicle where the corrective coefficient $K_m$ is $Km_m=0$ quickly reaches the target path M, but the path S traced by the vehicle W oscillates relatively largely across the target path M and gradually converges to the target path M. Therefore, the ability of the vehicle W to directionally follow the target path M is poor.

Figure 8A:
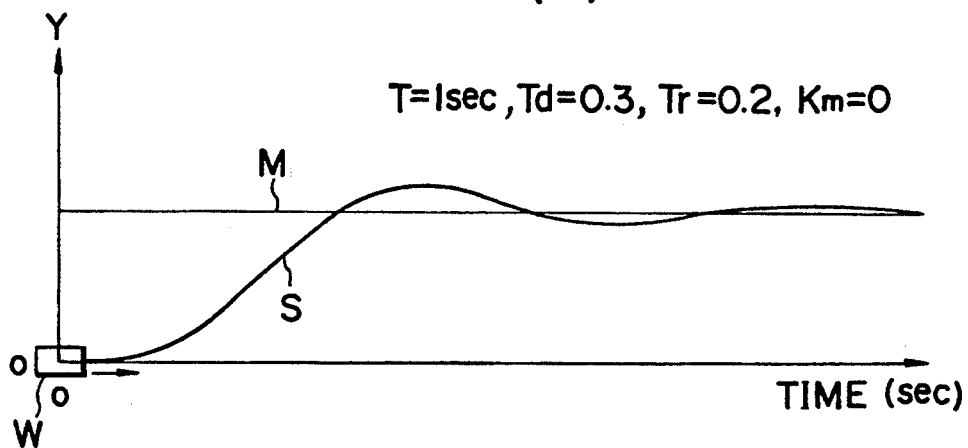
FIGS. 8(a), 8(b), and 8(c) are diagrams illustrative of the results of simulation processes on the automatic running vehicle.
Figure 8B:
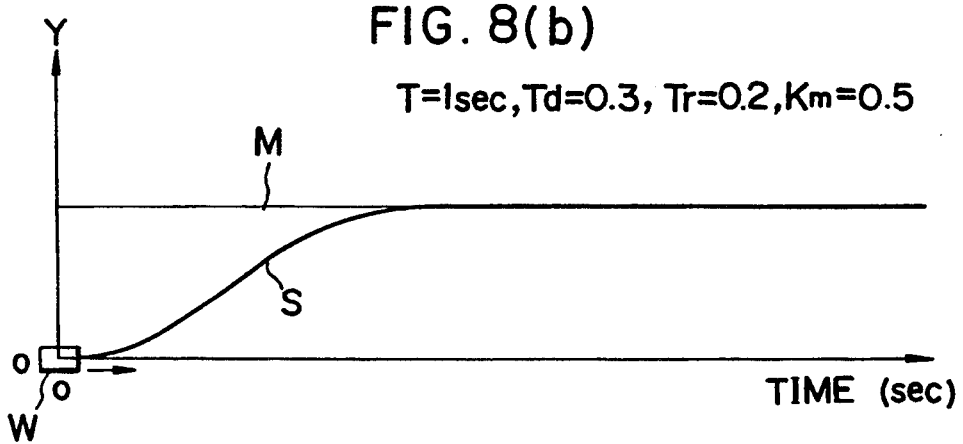
Figure 8C:
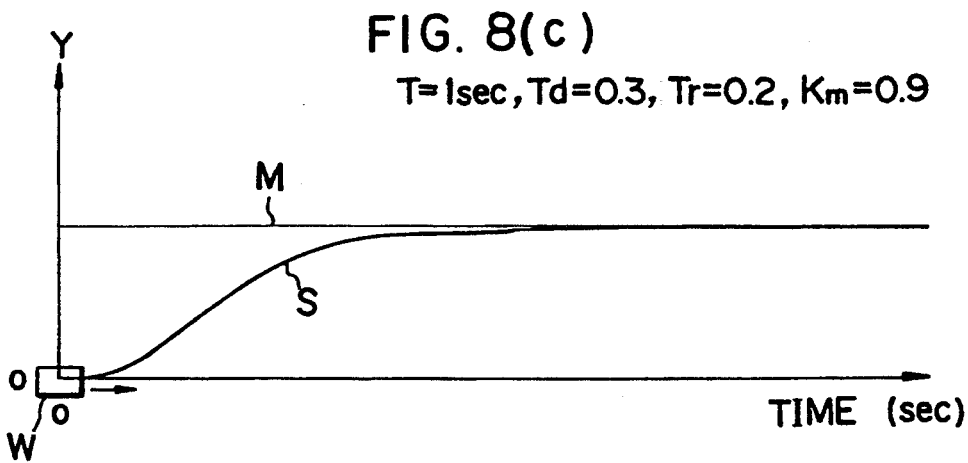
Figure 9A:
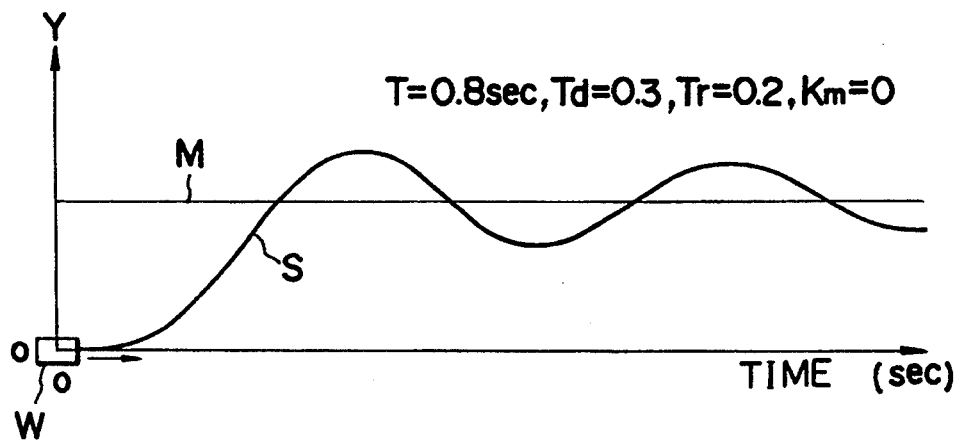
FIGS. 9(a), 9(b), and 9(c) are diagrams illustrative of the results of simulation processes on the automatic running vehicle.
Figure 9B:
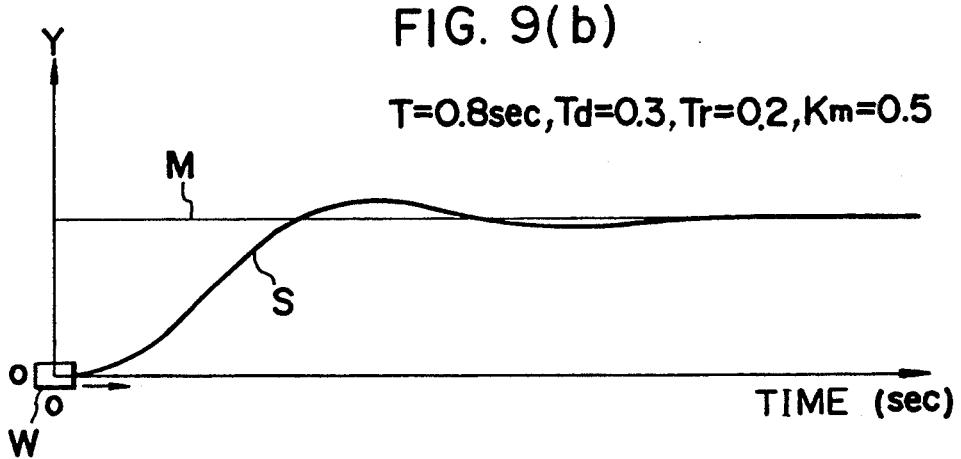
Figure 9C:
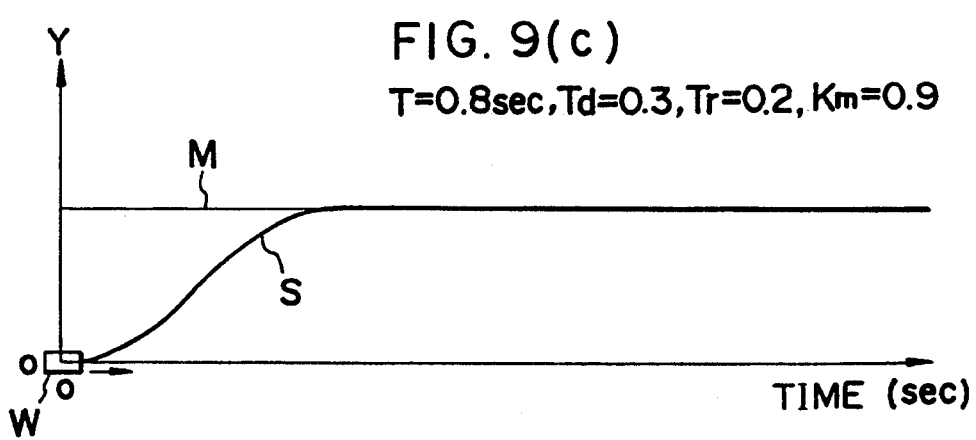
Figure 10A:
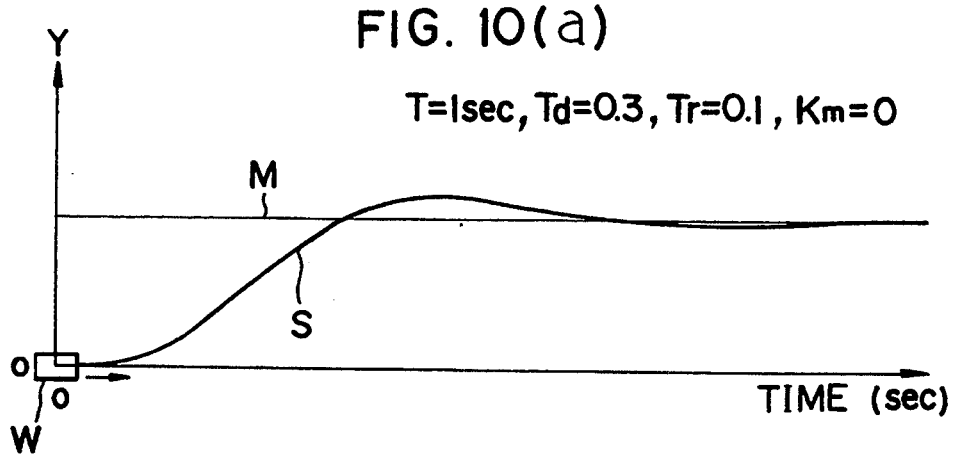
FIGS. 10(a), 10(b), and 10(c) are diagrams illustrative of the results of simulation processes on the automatic running vehicle.
Figure 10B:
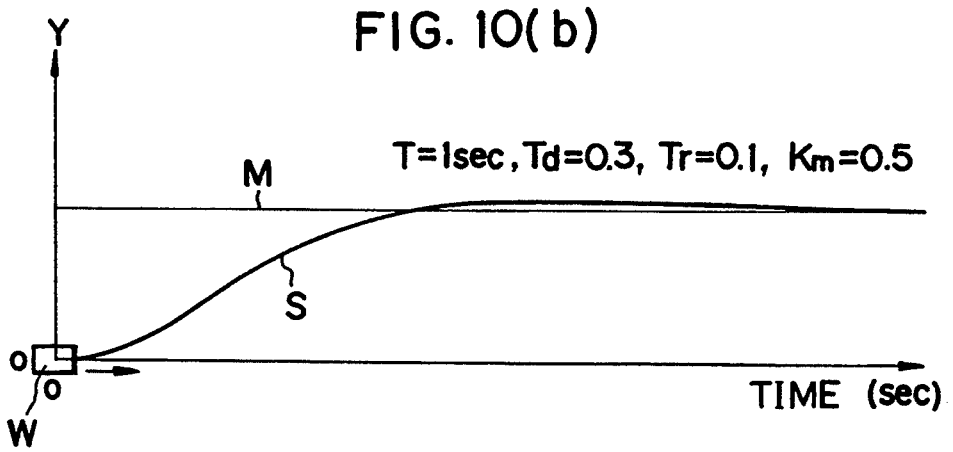
Figure 10C:
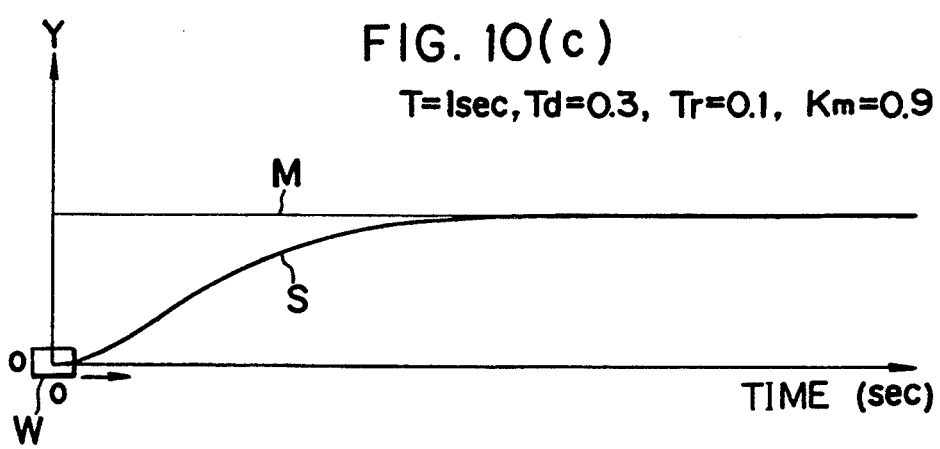
Figure 11A:
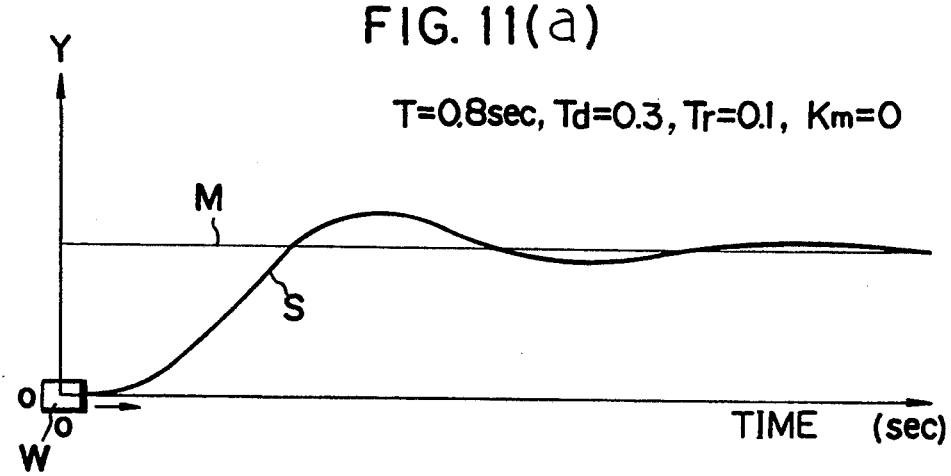
FIGS. 11(a), 11(b), and 11(c) are diagrams illustrative of the results of simulation processes on the automatic running vehicle.
Figure 11B:
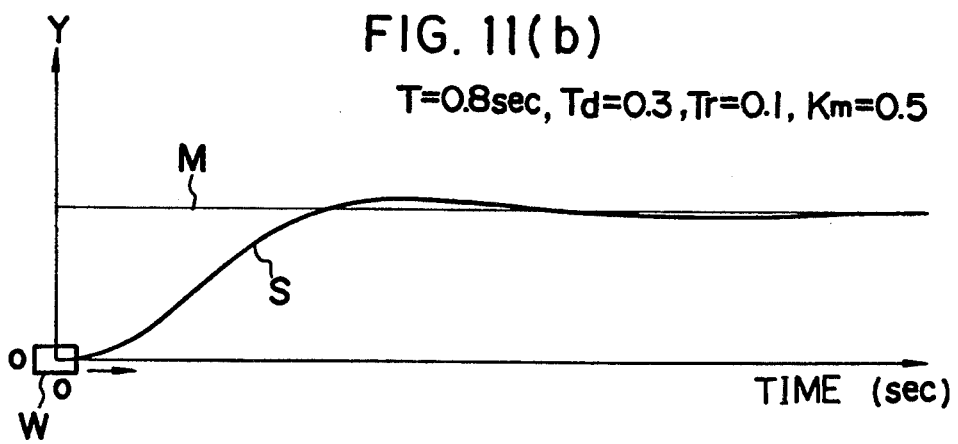
Figure 11C:
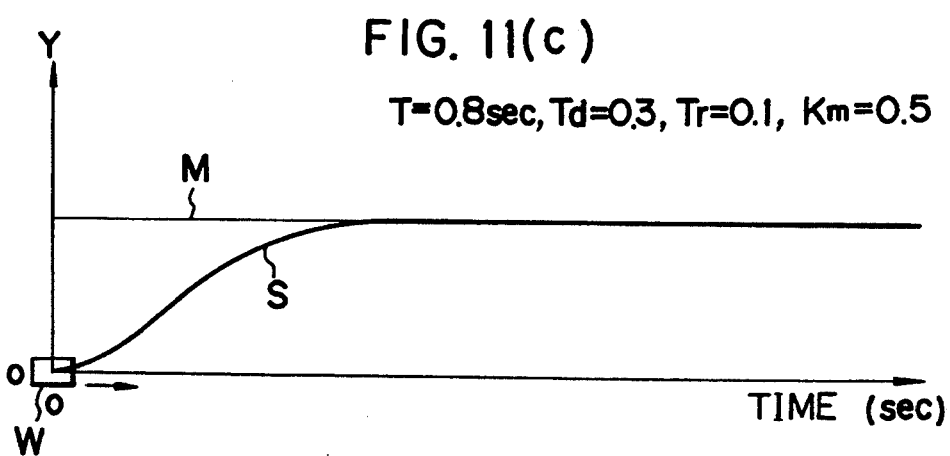
Figure 12A:
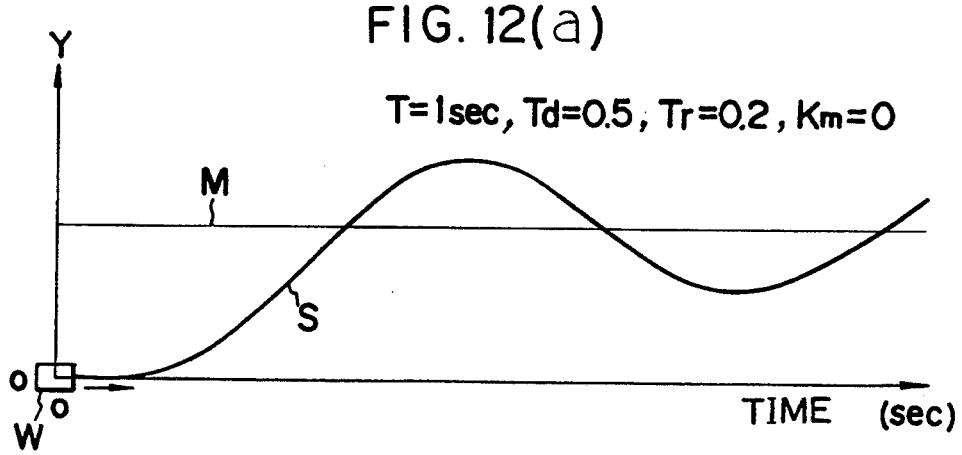
FIGS. 12(a), 12(b), and 12(c) are diagrams illustrative of the results of simulation processes on the automatic running vehicle.
Figure 12B:
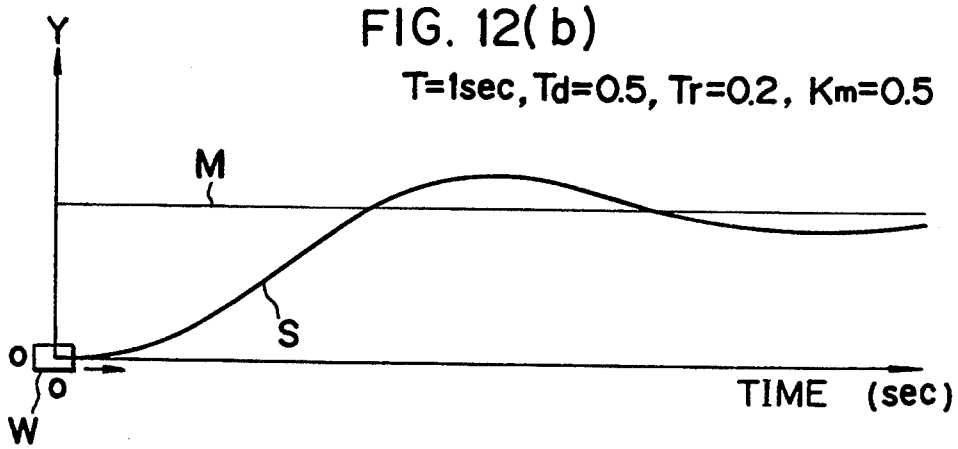
Figure 12C:
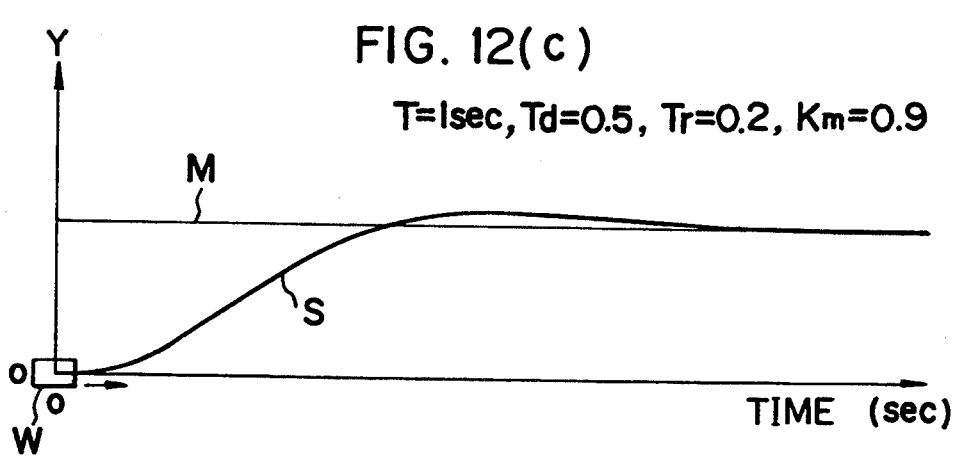

Comparison between FIGS. 8(a) and 9(a) or FIGS. 10(a) and 11(a) indicates that the ability of the vehicle to directionally follow the target path M is poorer when the predicted time T is smaller. Comparison between FIGS. 8(a) and 12(a) shows that the ability of the vehicle to directionally follow the target path M is much poorer when the steering angle time constant $T_d$ is larger, i.e., the mechanical response delay of the steering mechanism is larger. Furthermore, it can be seen from comparison between FIGS. 9(a) and 11(a) that the ability of the vehicle to directionally follow the target path M is also poorer when the yaw time constant $T_r$ is larger, i.e., the response delay of the actual yaw rate $\gamma$ with respect to the actual steering angle $\delta$ of the vehicle system is larger.

With the automatic running vehicle according to the present invention where the corrective coefficient $K_m$ is of a value in the range of $0<K_m<1$, the time required for the vehicle W to get to the target point P is slightly longer, but the path S converges more smoothly to the target path M as the value of the corrective coefficient $K_m$ is greater.

As can be seen from FIGS. 8(b), 8(c), 9(b), 9(c), 10(b), 10(c), 11(b), 11(c), 12(b), and 12(c), the above tendency is not impaired largely even if the predicted time T is small, or the steering angle time constant $T_d$ is large, or the yaw time constant $T_r$ is large. Particularly, as the value of the corrective coefficient $K_m$ is greater, the path S of the vehicle W converges more smoothly to the target path M irrespective of the magnitude of the predicted time T, the steering angle time constant $T_d$, or the yaw time constant $T_r$.

Thus, the automatic running vehicle according to the present invention can be controlled while smoothly following the target path M, so that the riding comfort of the vehicle W is highly improved.

In particular, since the vehicle W can smoothly follow the target path M even if the predicted time T is reduced, the target point P can be set to a position relatively close to the vehicle W even when the vehicle speed V is relatively high in the above calculation and control process. This means that although the target path M is established based on the image information in front of the vehicle W and the distance over which the target path M can be established is limited, it is possible to cause the vehicle W to run at high speed while smoothly following the target path M. This also means that insofar as the vehicle speed V is in a middle range, no problem occurs if the amount of data of the target path M required to establish the target point P and the amount of image information to establish the target point P are small. Accordingly, the time consumed to process the image information can be shortened.

Inasmuch as the corrective coefficient $K_m$ is determined dependent on the curvature $\rho$ and road width D of the travelable path and the vehicle speed V, the vehicle W can be controlled to travel along the target path M in a manner to match the road conditions and the running conditions.

As shown in FIG. 3, the angle $\theta_{PW}$ of the vehicle W at the target point P is determined on the assumption that the yaw rate of the vehicle W changes instantaneously from the present yaw rate $\gamma$ to the yaw rate $\gamma_P$ to reach the target point. Actually, however, the yaw rate of the vehicle W does not change instantaneously, but changes by correcting the steering angle $\delta$ of the steerable wheels 6 into a steering angle to produce the yaw rate $\gamma_P$ to reach the target point.

Changing the yaw rate by correcting the steering angle $\delta$ of the steerable wheels 6 results in a response delay due to the mechanical characteristics of the steering mechanism and the vehicle system.

Therefore, such a mechanical response delay should preferably be taken into account in determining the angle $\theta_{PW}$ of the vehicle W at the target point P, i.e., the angle $\theta_{PW}$ of the vehicle W after the predicted time T.

Given the mechanical response delay, the angle $\theta_{PW}$ of the vehicle W at the target point P is determined as follows:

As indicated in the transfer unit 24 shown in FIG. 7(b), the transfer characteristic for the output yaw rate (actual yaw rate) $\gamma$ in response to the input yaw rate (target yaw rate) $\gamma_m$ in the combined steering and vehicle system is given as follows, using the transfer function shown in FIG. 7(b):

$$\frac{\gamma}{\gamma_m} = \frac{1}{s^2 T_d T_r + s T_d + 1} \tag{33}$$

$$\therefore \gamma_m = (s^2 T_d T_r + s T_d + 1) \cdot \gamma.$$

The input yaw rate $\gamma_m$ in the equation (33) is replaced with the yaw rate $\gamma_P$ to achieve the target point, and then the equation (33) is expressed by a differential equation in time domain as follows:

$$T_d T_r \frac{d^2 \gamma}{dt^2} + T_d \frac{d\gamma}{dt} + \gamma = \gamma_P. \tag{34}$$

By solving the differential equation (34), the actual yaw rate $\gamma$ is determined as a time function in correcting the steering angle to produce the yaw rate $\gamma_P$ to achieve the target point.

Once the actual yaw rate $\gamma$ is determined as a time function, the angle $\theta_{PW}$ of the vehicle W after the predicted time T is determined by integrating the yaw rate $\gamma$ in a time range from 0 to T by way of definite integration, as follows:

$$\theta_{PW} = \int_0^T \gamma \, dt. \tag{35}$$

By taking into account the mechanical response delay of the steering mechanism and the vehicle system in determining the angle $\theta_{PW}$ of the vehicle W after the predicted time T, it is possible to determine the angle $\theta_{PW}$ of the vehicle W after the predicted time T with high accuracy, and to control the steering angle in a manner to match actual vehicle conditions.

In the embodiment, when correcting the yaw rate $\gamma_P$ to reach the target point to determine the target yaw rate $\gamma_m$, there are employed the curvature $\rho$ and road width D of the travelable path as condition quantities of the target path and the vehicle speed V as a condition quantity of the vehicle. However, the coefficient of friction $\mu$ and slope angle may be used as condition quantities of the target path, and a braked condition, an accelerated condition, a clutch operating condition, a steering condition, a transmission operating condition, and a spoiler operating condition may be used as condition quantities of the vehicle for correcting the yaw rate $\gamma_P$ to reach the target point.

While an automobile has been described above as a mobile body, the principles of the present invention are also applicable to the control of other mobile bodies including an airplane, a ship, an automatic walking robot, or a robot arm, or a virtual mobile body in a computer game, a simulation device, or the like. In such other applications, as with the illustrated embodiment, a control quantity to reach a target point for moving a mobile body to the target point on a target path is corrected based on an angle formed between the target path and the mobile body at the target point, for thereby determining a target control quantity to control the mobile body to follow the target path while taking into account the direction of the mobile body with respect to the target path.

A condition quantity of the target path used in correcting the control quantity to reach the target point into the target control quantity may be a curvature, a width, or a slope angle of an air route for an air plane or sea route for a ship. A condition quantity of the mobile body may be a steering condition for an airplane or a ship, or an operating condition of a flap or the like.

For a three-dimensionally movable mobile body such as an airplane, it is possible to determine a target control quantity based on not only a two-dimensional angle between the mobile body and the target path in a yaw direction, but also a three-dimensional angle in a pitch direction.

Although a certain preferred embodiment of the present invention has been shown and described in detail, it should be understood that various changes and modifications may be made therein without departing from the scope of the appended claims.

What is claimed is:

1. A system for controlling movement of a mobile body substantially along a target path, comprising:
    means for determining a target point on the target path;
    means for determining a control quantity which will cause said mobile body to reach said target point from an original position;
    means for determining a direction in which to move said mobile body toward said target point based on said control quantity;
    means for determining an angular difference between said direction and said target path at the target point as a target point angular difference;
    means for determining a target control quantity for the mobile body by correcting the control quantity such that the mobile body reaches the target point based on said target point angular difference; and
    means for controlling said mobile body based on said target control quantity.

2. A system according to claim 1, wherein said means for determining a target control quantity comprises means for determining a target control quantity using a condition quantity of said target path.

3. A system according to claim 2, wherein said condition quantity of said target path is a curvature of said target path, the arrangement being such that the control quantity to reach the target point is corrected into said target control quantity by an amount which is smaller as said curvature is greater.

4. A system according to claim 2, wherein said condition quantity of said target path is a width of said target path, the arrangement being such that the control quantity to reach the target point is corrected into said target control quantity by an amount which is greater as said width is greater.

5. A system according to claim 1, wherein said means for determining a target control quantity comprises means for determining a target control quantity using a condition quantity of said mobile body.

6. A system according to claim 5, wherein said condition quantity of said mobile body is a speed of said mobile body, the arrangement being such that the control quantity to reach the target point is corrected into said target control quantity by an amount which is greater as said speed is higher.

7. A system according to claim 1, wherein said mobile body comprises an automatic running vehicle having a steerable wheel, said control quantity being a yaw rate of the automatic running vehicle.

8. A system according to claim 7, wherein said means for controlling said mobile body based on said target control quantity as the target yaw rate comprises means for determining a target steering angle for the steerable wheel to generate the target yaw rate based on a predetermined yaw rate and a steering angle of the steerable wheel, and means for correcting said steering angle into said target steering angle.

9. A system according to claim 7, wherein said means for determining a target control quantity comprises means for multiplying an amount to correct said yaw rate which is required to eliminate said target point angular difference by a corrective coefficient having a value ranging from 0 to 1 depending on a curvature and a width of said target path and a speed of said mobile body, to determine an amount to correct a yaw rate to reach the target point as said control quantity to reach the target point into a target yaw rate as said target control quantity.

10. A system according to claim 9, wherein said means for determining a target control quantity comprises means for determining said corrective coefficient from said curvature, said width, and said speed according to a fuzzy reasoning process such that said corrective coefficient is smaller as said curvature is larger, said corrective coefficient is larger as said width is larger, and said corrective coefficient is larger as said speed is higher.

11. A system according to claim 7, wherein said means for determining a direction comprises means for determining said direction taking into account the response of the steering angle of the steerable wheel when the steerable wheel is steered to generate the yaw rate to reach said target point, and the response of the yaw rate to the steering angle.

* * * * *